United States Patent
Park et al.

(10) Patent No.: US 9,655,108 B2
(45) Date of Patent: May 16, 2017

(54) METHOD FOR TRANSMITTING AND RECEIVING UPLINK OR DOWNLINK SIGNAL AND DEVICE THEREFOR

(71) Applicant: LG ELECTRONICS INC., Seoul (KR)

(72) Inventors: Jonghyun Park, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 240 days.

(21) Appl. No.: 14/374,192

(22) PCT Filed: Feb. 1, 2013

(86) PCT No.: PCT/KR2013/000834
§ 371 (c)(1),
(2) Date: Jul. 23, 2014

(87) PCT Pub. No.: WO2013/115598
PCT Pub. Date: Aug. 8, 2013

(65) Prior Publication Data
US 2015/0036604 A1    Feb. 5, 2015

Related U.S. Application Data

(60) Provisional application No. 61/595,013, filed on Feb. 3, 2012, provisional application No. 61/602,058, filed on Feb. 22, 2012.

(51) Int. Cl.
*H04W 4/00* (2009.01)
*H04W 72/04* (2009.01)
(Continued)

(52) U.S. Cl.
CPC ....... *H04W 72/0446* (2013.01); *H04L 5/0037* (2013.01); *H04L 5/0048* (2013.01);
(Continued)

(58) Field of Classification Search
CPC .................................................. H04W 72/0446
(Continued)

(56) References Cited

U.S. PATENT DOCUMENTS

| 2009/0116459 A1* | 5/2009 | Do | H04J 11/0069 370/336 |
| 2011/0009129 A1* | 1/2011 | Lim | G01S 5/0036 455/456.1 |

(Continued)

FOREIGN PATENT DOCUMENTS

| KR | 10-2011-0093794 | 8/2011 |
| KR | 10-2012-0001598 | 1/2012 |

OTHER PUBLICATIONS

LG Electronics, "Uplink Control Signals for CoMP," 3GPP TSG RAN WG1 Meeting #66bis, R1-113282, Oct. 2011, 2 pages.
(Continued)

*Primary Examiner* — Shripal Khajuria
(74) *Attorney, Agent, or Firm* — Lee Hong Degerman Kang & Waimey

(57) ABSTRACT

A method for transmitting an uplink signal in a wireless communication system according to one embodiment of the present invention comprises: receiving, from a first cell, information on a slot number of a radio frame of a second cell and identifier information that includes a virtual identifier or an identifier of the second cell; and generating a sequence for an uplink signal on the basis of the information on the slot number and the identifier information; and transmitting the generated sequence to the second cell.

8 Claims, 18 Drawing Sheets

(51) Int. Cl.
    *H04L 5/00*          (2006.01)
    *H04L 12/801*       (2013.01)
    *H04W 48/08*      (2009.01)

(52) U.S. Cl.
    CPC ............. *H04L 47/34* (2013.01); *H04W 48/08* (2013.01); *H04L 5/0007* (2013.01); *H04L 5/0053* (2013.01)

(58) Field of Classification Search
    USPC ........................................................ 370/329
    See application file for complete search history.

(56) References Cited

U.S. PATENT DOCUMENTS

2011/0038398 A1    2/2011   Konno et al.
2011/0090817 A1    4/2011   Qu et al.

OTHER PUBLICATIONS

PCT International Application No. PCT/KR2013/000834, Written Opinion of the International Searching Authority dated May 15, 2013, 1 page.

\* cited by examiner

PUCCH format 1a/1b structure (normal CP)

PUCCH format 1a/1b structure (extended CP)

PUCCH format 2/2a/2b structure (normal CP)

PUCCH format 2/2a/2b structure (extended CP)

METHOD FOR TRANSMITTING AND RECEIVING UPLINK OR DOWNLINK SIGNAL AND DEVICE THEREFOR

CROSS-REFERENCE TO RELATED APPLICATIONS

This application is the National Stage filing under 35 U.S.C. 371 of International Application No. PCT/KR2013/000834, filed on Feb. 1, 2013, which claims the benefit of U.S. Provisional Application Ser. Nos. 61/595,013, filed on Feb. 3, 2012 and 61/602,058, filed on Feb. 22, 2012, the contents of which are all hereby incorporated by reference herein in their entirety.

TECHNICAL FIELD

The present disclosure relates to wireless communication system. More specifically, the present disclosure relates to a method for transmitting uplink signal or receiving downlink signal and apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed. In addition, a communication environment has evolved into increasing density of nodes accessible by a user at the periphery of the nodes. A node refers to a fixed point capable of transmitting/receiving a radio signal to/from a user equipment through one or more antennas. A communication system including high-density nodes may provide a better communication service to the user through cooperation between the nodes.

Such a multi-node cooperative communication scheme in which a plurality of nodes performs communication with the UE using the same time-frequency resource has much better data throughput than a conventional communication scheme in which the nodes perform communication with the UE without any cooperation by operating as independent eNBs.

A multi-node system performs cooperative communication using a plurality of nodes, each node operating as an eNB, an access point, an antenna, an antenna group, a radio remote header (RRH), or a radio remote unit (RRU). Unlike a conventional centralized antenna system in which antennas converge upon an eNB, the nodes are typically separated from each other by a predetermined interval or more in the multi-node system. The nodes may be managed by one or more eNBs or eNB controllers for controlling the operation thereof or scheduling data transmission/reception therethrough. Each node is connected to the eNB or eNB controller for managing the node through a cable or a dedicated line.

Such a multi-node system may be regarded as a type of MIMO system in that distributed nodes are capable of communicating with a single or multiple UEs by simultaneously transmitting/receiving different streams. However, since the multi-node system transmits signals using nodes distributed at various locations, a transmission region which should be covered by each antenna decreases in comparison with antennas included in the conventional centralized antenna system. Accordingly, compared with a conventional system implementing MIMO technology in the centralized antenna system, a transmit power needed when each antenna transmits a signal may be reduced in the multi-node system. In addition, since the transmission distance between an antenna and a UE is shortened, path loss is reduced and high-speed data transmission is achieved. Therefore, transmission capacity and power efficiency of a cellular system can be enhanced and relatively uniform quality of communication performance can be satisfied irrespective of the locations of UEs in a cell. Furthermore, in the multi-node system, since an eNB(s) or eNB controller(s) connected to multiple nodes performs cooperative data transmission/reception, signal loss generated in a transmission process is reduced. In addition, when nodes distant from each other by a predetermined distance or more perform cooperative communication with the UE, correlation and interference between antennas are reduced. Hence, according to the multi-node cooperative communication scheme, a high signal to interference-plus-noise ratio (SINR) can be achieved.

Due to such advantages of the multi-node system, in the next-generation mobile communication system, the multi-node system has emerged as a new basis of cellular communication through combination with or by replacing conventional centralized antenna systems in order to reduce additional installation costs of an eNB and maintenance costs of a backhaul network and simultaneously to expand service coverage and enhance channel capacity and SINR.

DISCLOSURE

Technical Problem

The present disclosure relates to a method for efficiently transmitting or receiving uplink/downlink signal or an apparatus therefor.

More specifically, provided is a method for efficiently and reliably transmitting or receiving uplink/downlink signal or an apparatus therefor when a cell transmitting downlink signal to a user equipment (UE) and a cell receiving uplink signal from the UE are different.

The technical objects that can be achieved through the present invention are not limited to what has been particularly described hereinabove and other technical objects not described herein will be more clearly understood by persons skilled in the art from the following detailed description.

Technical Solution

Provided is a method for transmitting an uplink signal in a wireless communication system comprising: receiving information on a slot number of a radio frame of a second cell and identifier (ID) information including an ID or virtual ID of the second cell from a first cell; generating a sequence for an uplink signal based on the information on the slot number and the ID information; and transmitting the generated sequence to the second cell.

Additionally or alternatively, the information on the slot number may include a slot number of a radio frame of the second cell at a specific time.

Additionally or alternatively, the information on the slot number may include a difference between a slot number of a radio frame of the first cell and a slot number of a radio frame of the second cell.

Additionally or alternatively, the generating the sequence may include generating a sequence using an equation mod $(n_s+n_{s'}, 20)$, wherein $n_s$ is a slot number of a radio frame of the first cell, and $n_{s'}$ is a difference between a slot number of a radio frame of the first cell and a slot number of a radio frame of the second cell.

Additionally or alternatively, the generating the sequence may include obtaining a cyclic shift (CS) value based on the information on the slot number; and cyclically shifting a given base sequence using the cyclic shift (CS) value.

Additionally or alternatively, the generating the sequence includes performing group hopping of the sequence using a sequence group number determined according to a group hopping pattern, the group hopping pattern being based on the information on the slot number, wherein the group hopping pattern is determined by a pseudo random sequence.

Additionally or alternatively, the generating the sequence may include performing sequence hopping of the sequence using a base sequence number determined by a pseudo random sequence based on the information on the slot number.

Additionally or alternatively, a generator of the pseudo random sequence may be initialized using the ID information when each radio frame begins.

Provided is a method for transmitting an uplink data signal in a wireless communication system comprising: receiving information on a slot number of a radio frame of a second cell, and identifier (ID) information including an ID or virtual ID of the second cell from a first cell; obtaining a physical resource block (PRB) number for an uplink data signal based on the information on the slot number and the ID information; and mapping the uplink data signal to a physical resource indicated by the physical resource block (PRB) number, and transmitting the uplink data signal.

Additionally or alternatively, the information on the slot number may include a slot number of a radio frame of the second cell at a specific time.

Additionally or alternatively, the information on the slot number may include a difference between a slot number of a radio frame of the first cell and a slot number of a radio frame of the second cell.

Additionally or alternatively, the obtaining the physical resource block (PRB) number may include obtaining the PRB number using an equation mod$(n_s+n_{s'}, 20)$, wherein $n_s$ is a slot number of a radio frame of the first cell, and $n_{s'}$ is a difference between a slot number of a radio frame of the first cell and a slot number of a radio frame of the second cell.

Additionally or alternatively, the PRB number may be generated using a pseudo random sequence, and a generator of the pseudo random sequence is initialized using the information on the slot number and the ID information when each radio frame begins.

Provided is a method for receiving a downlink signal in a wireless communication system comprising receiving information on a slot number of a radio frame of a second cell, and identifier (ID) information including an ID or virtual ID of the second cell from a first cell; obtaining a downlink demodulation reference signal (DMRS) sequence based on the information on the slot number and the ID information; and demodulating a downlink signal received from the second cell based on the downlink DMRS sequence.

Additionally or alternatively, the information on the slot number may include a slot number of a radio frame of the second cell at a specific time.

Additionally or alternatively, the information on the slot number may include a difference between a slot number of a radio frame of the first cell and a slot number of a radio frame of the second cell.

Additionally or alternatively, the obtaining the downlink DMRS sequence may include obtaining the downlink DMRS sequence using an equation mod$(n_s+n_{s'}, 20)$, wherein $n_s$ is a slot number of a radio frame of the first cell, and $n_{s'}$ is a difference between a slot number of a radio frame of the first cell and a slot number of a radio frame of the second cell.

Additionally or alternatively, the DMRS may be generated using a pseudo random sequence, and a generator of the pseudo random sequence is initialized using the information on the slot number and the ID information when each radio frame begins.

Provided is a user equipment (UE) configured to transmit an uplink signal in a wireless communication system, comprising: a radio frequency (RF) unit; and a processor configured to control the RF unit, wherein the processor may be configured to: control the RF unit to receive information on a slot number of a radio frame of a second cell and identifier (ID) information including an ID or virtual ID of the second cell from a first cell, and generate a sequence for an uplink signal based on the information on the slot number and the ID information and transmit the generated sequence to the second cell.

Provided is a user equipment (UE) configured to transmit an uplink data signal in a wireless communication system, comprising: a radio frequency (RF) unit; and a processor configured to control the RF unit, wherein the processor is configured to: control the RF unit to receive information on a slot number of a radio frame of a second cell and identifier (ID) information including an ID or virtual ID of the second cell from a first cell, and obtain a physical resource block (PRB) number for an uplink data signal based on the information on the slot number and the ID information, and map the uplink data signal to a physical resource indicated by the physical resource block (PRB) number, and then transmit the uplink data signal to the second cell.

Provided is a user equipment (UE) configured to transmit a downlink signal in a wireless communication system, comprising: a radio frequency (RF) unit; and a processor configured to control the RF unit, wherein the processor is configured to: control the RF unit to receive information on a slot number of a radio frame of a second cell and identifier (ID) information including an identifier (ID) or virtual ID of the second cell from a first cell, and obtain a downlink demodulation reference signal (DMRS) sequence based on the information on the slot number and the ID information and demodulate a downlink signal received from the second cell based on the downlink DMRS sequence.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present disclosure, collision of radio resources can be avoided when a cell transmitting downlink signal to a user equipment (UE) and a cell receiving uplink signal from the UE are different.

Additionally, according to the present disclosure, collision of radio resources can be avoided when the UE receives downlink signals from a plurality of cells or the UE transmits uplink signals to the plurality of cells.

Additionally, according to the present disclosure, efficiency for utilizing uplink/downlink radio resources can be improved.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
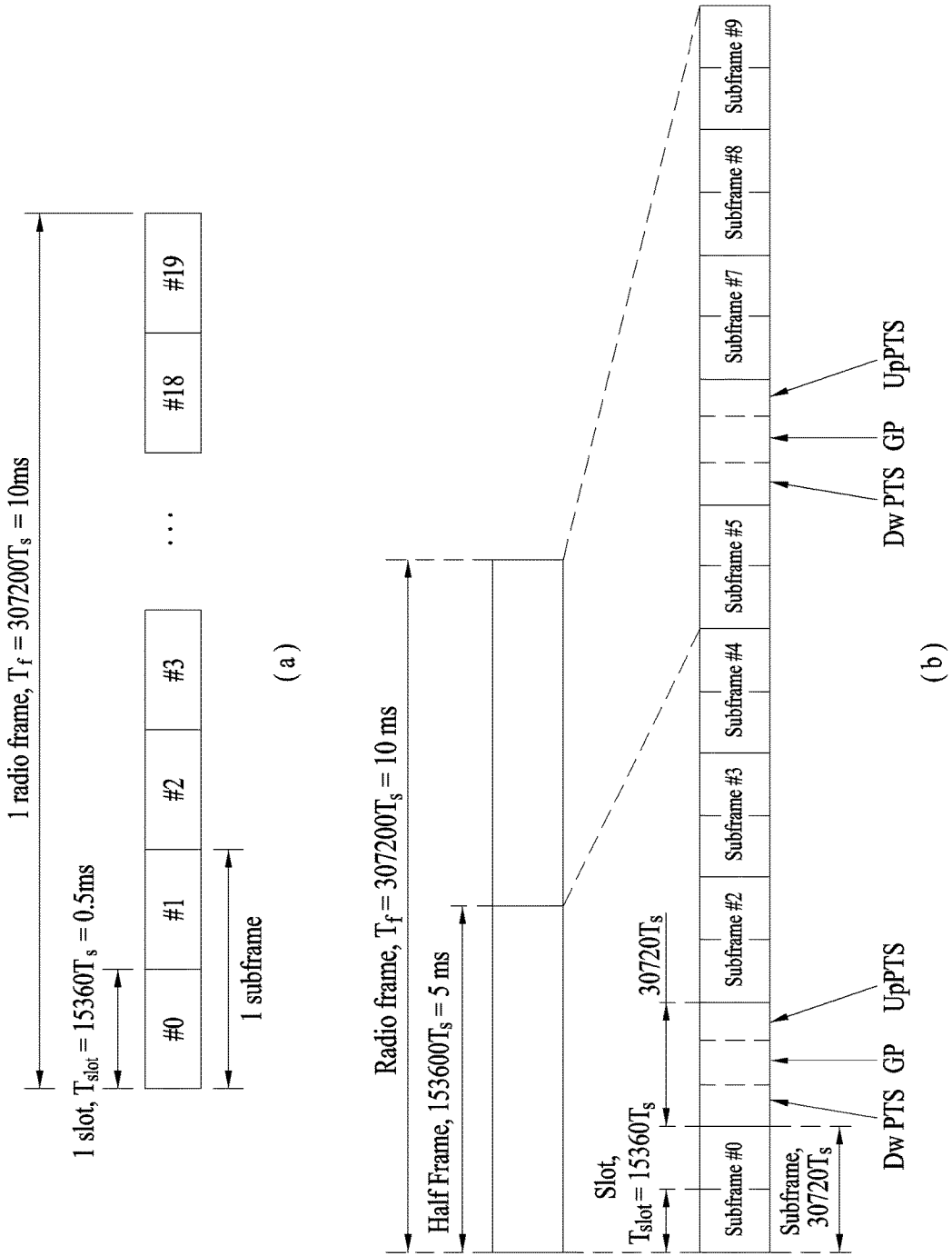
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a base station (BS) generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Hereinafter, a BS is referred to as an eNB.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, an RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. Unlike a conventional centralized antenna system (CAS) (i.e. a single-node system) including antennas which converge upon an eNB and are controlled by one eNB controller, a multi-node system includes a plurality of nodes separated from one another by a predetermined distance or more. The plural nodes may be managed by one or more eNBs or eNB controllers for controlling operation thereof or scheduling data transmission/reception therethrough. Each node may be connected to an eNB or eNB controller for managing the node through a cable or a dedicated line. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system of the present invention, which will be described below, one or more eNBs or eNB controllers, connected to a plurality of nodes, may control the plural nodes to simultaneously transmit or receive signals to or from a UE through some or all of the plural nodes. Although there is a difference between multi-node systems according to the nature of each node and implementation form of each node, the multi-node systems are different from single-node systems (e.g. a CAS, a conventional MIMO system, a conventional relay system, a conventional repeater system, etc.), in that plural nodes participate in providing a communication service to a UE on a predetermined time-frequency resource. Accordingly, embodiments of the present invention regarding a method for performing cooperative data transmission using some or all of plural nodes may be applied to various types of multi-node systems. For example, while a node generally refers to an antenna group separated by a predetermined interval or more from another node, the embodiments of the present invention, which will be described later, may be applied even when a node means an arbitrary antenna group irrespective of how far the node is separated from another node. For example, when an eNB includes a cross polarized (X-pole) antenna, the embodiments of the present invention are applicable under the assumption that the eNB controls a node including a horizontally polarized (H-pole) antenna and a node including a vertically polarized (V-pole) antenna.

A communication scheme capable of transmitting/receiving a signal through a plurality of transmission (TX)/reception (RX) nodes, transmitting/receiving a signal through at least one node selected from among a plurality of TX/RX nodes, or differentiating a node transmitting a downlink signal from a node receiving an uplink signal is referred to as multi-eNB MIMO or coordinated multi-point TX/RX (CoMP). A coordinated transmission scheme of such coordinated communication between nodes may be classified largely into joint processing (JP) and scheduling coordination (CB). The JP scheme may further be divided into joint transmission (JT) and dynamic point selection (DPS) and the CB scheme may further be divided into coordinated scheduling (CS) and coordinated beamforming (CB). DPS may also be called dynamic cell selection (DCS). When JP is performed compared with other communication schemes among coordination communication schemes between nodes, a wider variety of communication environments may be formed. JT of the JP scheme is a communication scheme for transmitting the same stream to a UE from a plurality of nodes. The UE restores the stream by combining signals received from the plural nodes. JT can improve reliability of signal transmission using transmit diversity because the same stream is transmitted by plural nodes. DPS of the JP scheme is a communication scheme for transmitting/receiving a signal through one node selected according to a specific rule from among a plurality of nodes. In DPS, since a node having a good channel state with a UE will typically be selected as a communication node, reliability of signal transmission can be improved.

Meanwhile, in the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink/uplink signal of a specific cell refers to a downlink/uplink signal from/to an eNB or a node which provides a communication service to the specific cell. Furthermore, channel status/quality of a specific cell refers to channel status/quality of a channel or communication link formed between an eNB or node which provides a communication service to the specific cell and a UE. In a 3GPP LTE-A based system, the UE may measure a downlink channel state from a specific node using a channel state information-reference signal(s) (CSI-RS(s)) transmitted on a CSI-RS resource allocated to the specific node by an antenna port(s) of the specific node. Generally, neighboring nodes transmit corresponding CSI-RSs on orthogonal CSI-RS resources. When CSI-RS resources are orthogonal, this mean that at least one of CSI-RS resource configuration which specify symbols and subcarriers carrying the CSI-RSs, subframe configuration which specify subframes, to which CSI-RSs are allocated, by using subframe offset, transmission period and etc., and/or CSI-RS sequence is different from each other.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH) and a physical uplink shared channel (PUSCH) refer to a set of time-frequency resources or REs carrying uplink control information (UCI) and a set of time-frequency resources or REs uplink data, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH transmission of a UE is conceptually identical to UCI/uplink data/random access signal transmission on PUSCH/PUCCH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates the structure of a radio frame used in a wireless communication system. Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE(-A) radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | —             | —            | —            |
| 8 | 24144 · $T_s$ |              |              | —             | —            | —            |

Figure 2:
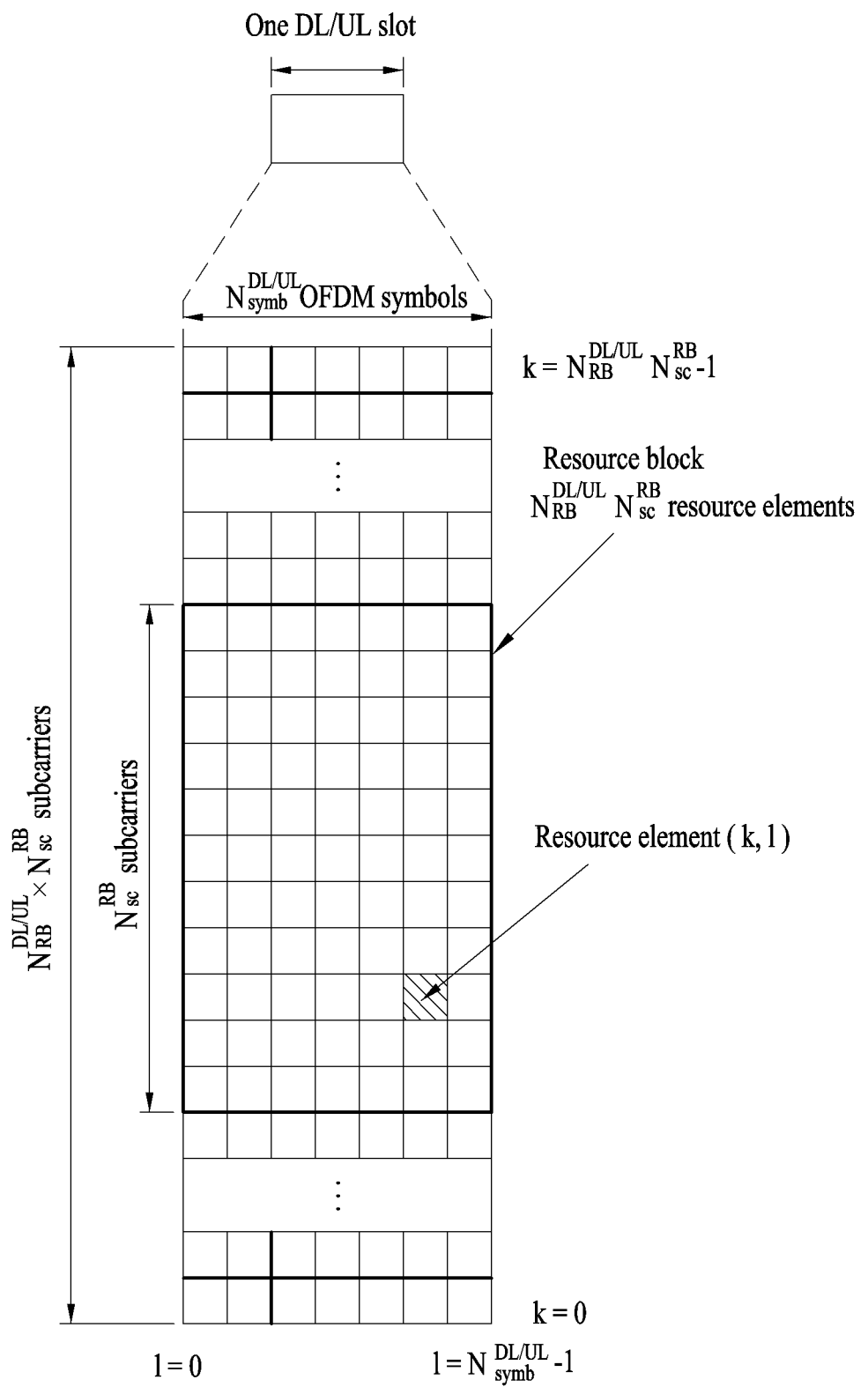
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE(-A) system. One resource grid is defined per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/DL}_{symb}-1$ in the time domain.

In one subframe, two RBs each located in two slots of the subframe while occupying the same $N^{RB}_{sc}$ consecutive sub-carriers are referred to as a physical resource block (PRB) pair. Two RBs configuring a PRB pair have the same PRB number (or the same PRB index).

Figure 3:
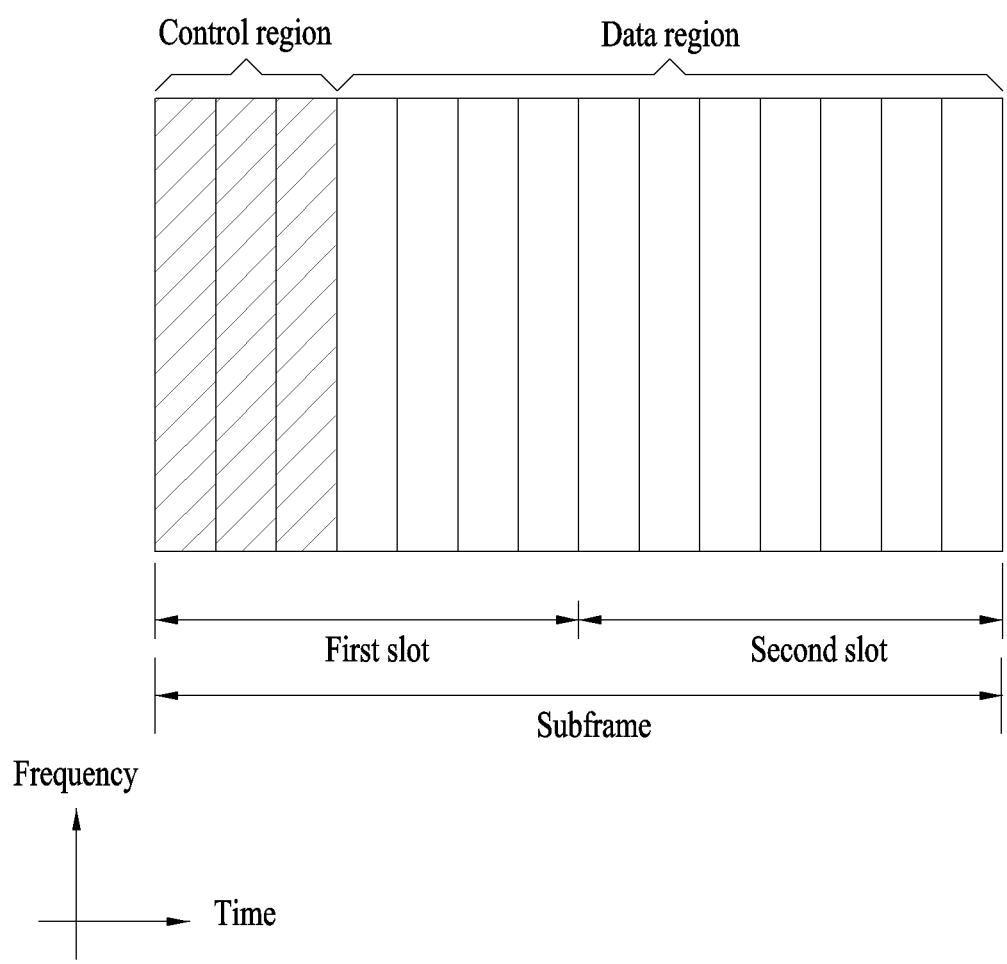
FIG. 3 illustrates the structure of a DL subframe used in a 3GPP (3rd Generation Partnership Project) LTE (Long Term Evolution)/LTE-A (Advanced) system.

FIG. 3 illustrates the structure of a DL subframe used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual UEs within a UE group, Tx power control information, and activity information of voice over Internet protocol (VoIP). The size and usage of the DCI carried by one PDCCH are varied depending on DCI formats. The size of the DCI may be varied depending on a coding rate. In the current 3GPP LTE system, various formats are defined, wherein format 0 is defined for a UL, and formats 1, 1A, 1B, 1C, 1D, 2, 2A, 3, and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

Generally, a DCI format capable of being transmitted to the UE differs according to transmission mode (TM) configured for the UE. In other words, for the UE configured as a specific TM, all DCI formats cannot be used and only predetermined DCI format(s) corresponding to the specific TM can be used.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. In a 3GPP LTE system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. In the 3GPP LTE/LTE-A system, SSs for respective PDCCH formats may have different sizes and a dedicated search space and a common search space are defined. The dedicated search space is a UE-specific search space and is configured for each individual UE. The common search space is configured for a plurality of UEs. One PDCCH candidate corresponds to 1, 2, 4, or 8 CCEs according to CCE aggregation levels. An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

The eNB may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of DCI transmitted on one PDCCH may vary according to DCI format and the size of the DCI may vary according to coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

For demodulation of a signal transmitted between an eNB and a UE, a reference signal (RS) to be compared with a data signal is needed. The RS indicates a signal of a predefined special waveform, known to the eNB and UE, transmitted from the eNB to the UE or from the UE to the eNB and is referred to as a pilot signal. RSs are classified into a cell-specific RS (CRS) commonly used by all UEs in a cell and a demodulation RS (DM RS) dedicated to a specific UE. A DM RS that the eNB transmits for DL data demodulation for a specific UE may be referred to specifically as a UE-specific RS. The DL DM RS and CRS may be transmitted together or one of the DM RS or the CRS may be transmitted. Nonetheless, in the case in which only the DM RS is transmitted without the CRS, an RS for channel measurement should be separately provided because the DM RS transmitted by applying the same precoder as data can be used only for demodulation. For example, in 3FPP LTE(-A), a CSI-RS, which is an additional RS for measurement, is transmitted to the UE so that the UE may measure CSI. The CSI-RS is transmitted in every prescribed transmission period comprised of multiple subframes, unlike a CRS transmitted in every subframe, based on the fact that channel state does not undergo a substantial variation over time.

Figure 4:
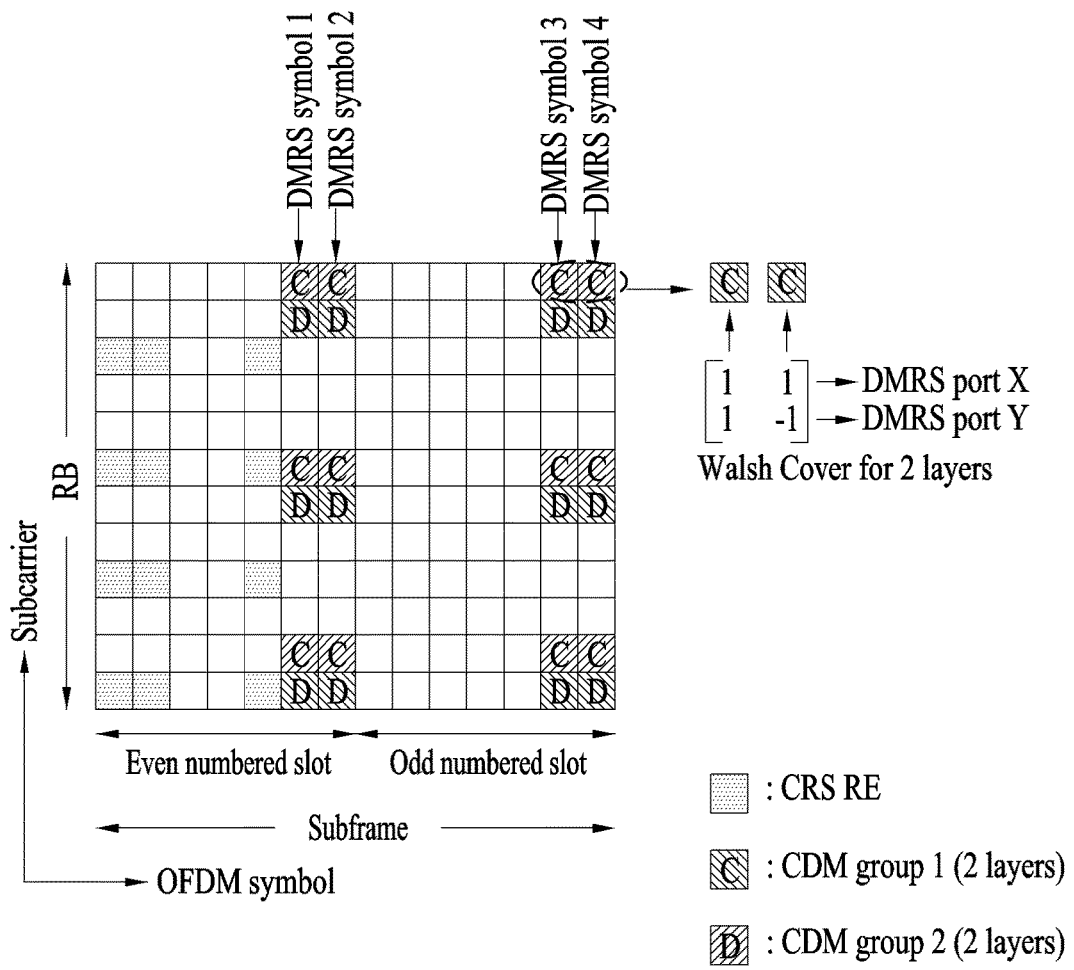
FIGS. 4 and 5 illustrate time-frequency resources for cell-specific reference signals (CRSs) and demodulation reference signals (DM RSs) in an RB pair of a normal subframe having a normal cyclic prefix (CP).
Figure 5:
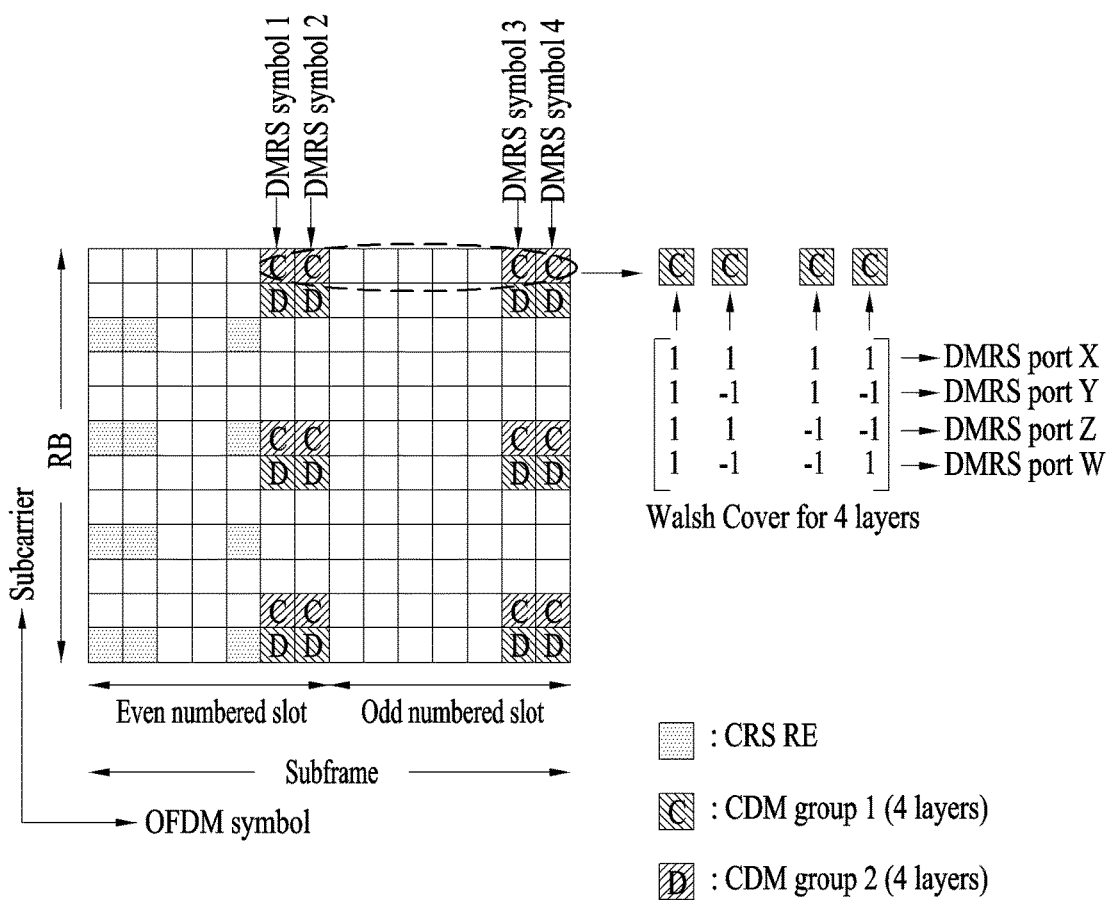

FIGS. 4 and 5 illustrate time-frequency resources for CRSs and DM RSs in an RB pair of a normal subframe having a normal CP. Specifically, FIG. 4 illustrates a method for multiplexing a maximum of 4 DM RSs with two CDM groups and FIG. 5 illustrates a method for multiplexing a maximum of 8 DM RSs with two CDM groups.

Referring to FIGS. 4 and 5, DM RSs are defined in a PRB pair in a 3GPP LTE(-A) system. Hereinbelow, among REs of one PRB pair, a set of REs in which distinguishable DM RSs extended by orthogonal cover codes are transmitted is referred to as a code division multiplexing (CDM) group. The orthogonal cover code may be, for example, a Walsh-Hadmard code. The orthogonal cover code may also be called an orthogonal sequence. Referring to FIGS. 4 and 5, REs denoted by 'C' belong to one CDM group (hereinafter, CDM group 1) and REs denoted by 'D' belong to another CDM group (hereinafter, a CDM group 2).

In a 3GPP LTE(-A) system, a plurality of layers may be multiplexed in one subframe and then is transmitted to a receiving device. In the present invention, a layer transmitted by a transmitting device indicates an information input path to a precoder. The layer may be referred to as a transmission layer, a stream, a transmission stream, or a data stream. Transmission data is mapped to one or more layers. Therefore, data is transmitted from the transmitting device to the receiving device by one or more layers. In case of multi-layer transmission, the transmitting device transmits DM RS per layer, and the number of DM RSs increases in proportion to the number of transmission layers.

One antenna port may transmit one layer and one DM RS. When the transmitting device needs to transmit 8 layers, a maximum of four antenna ports may transmit four DM RSs using one CDM group. For example, referring to FIG. 5, DM RS port X, DM RS port Y, DM RS port Z, and DM RS port W may transmit four DM RSs spread by different orthogonal sequences, respectively, using the same CDM group. The receiving device may detect the DM RSs from signals received on four consecutive DM RS REs in an OFDM direction, using orthogonal sequences used to multiplex the DM RSs on the four DM RS REs.

A DM RS is generated from a seed value based on a physical layer cell ID $N^{cell}_{ID}$. For example, for any of antenna ports p∈{7, 8, . . . , γ+6}, the DM RS may be defined by $$r(m) = \frac{1}{\sqrt{2}}(1 - 2 \cdot c(2m)) + j\frac{1}{\sqrt{2}}(1 - 2 \cdot c(2m + 1)),$$ [Equation 1]

$$m = \begin{cases} 0, 1, \ldots, 12N^{max,DL}_{RB} - 1 & normal cyclic prefix \\ 0, 1, \ldots, 16N^{max,DL}_{RB} - 1 & extended cyclic prefix \end{cases}$$

In Equation 1, $N^{max,DL}_{RB}$ is the largest DL bandwidth configuration, expressed in multiples of $N^{RB}_{sc}$. The pseudo-random sequence c(i) may be defined by a length-31 Gold sequence. The output sequence c(n) of length $M_{PN}$, where n=0, 1, . . . , $M_{PN}$−1, is defined by the following equation.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$ [Equation 2]

In Equation 2, $N_C$=1600 and the first m-sequence is initialized with $x_1(0)$=1, $x_1(n)$=0, n=1, 2, . . . , 30. The initialization of the second m-sequence is denoted by the following equation with a value depending on the application of the sequence.

$$c_{init}=\Sigma_{i=0}^{30}x_2(i) \cdot 2^i$$ [Equation 3]

For Equation 1, the pseudo-random sequence generator is initialized with the following equation at the start of each subframe.

$$c_{init}=(\lfloor n_s/2 \rfloor+1) \cdot (2N_{ID}^{cell}+1) \cdot 2^{16}+n_{SCID}$$ [Equation 4]

In Equation 4, the value of $n_{SCID}$ is zero unless specified otherwise. For a PDSCH transmission on ports 7 or 8, $n_{SCID}$ is given by the DCI format 2B or 2C associated with the PDSCH transmission. DCI format 2B is a DCI format for resource assignment for a PDSCH using up to two antenna ports with DM RSs and DCI format 2C is a DCI format for resource assignment for a PDSCH using up to 8 antenna ports with DM RSs. In the case of DCI format 2B, $n_{SCID}$ is indicated by the scrambling identity field according to Table 3. In the case of DCI format 2C, $n_{SCID}$ is given by Table 4.

TABLE 3

| Scrambling identity field in DCI format 2B | $n_{SCID}$ |
|---|---|
| 0 | 0 |
| 1 | 1 |

TABLE 4

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Figure 6:
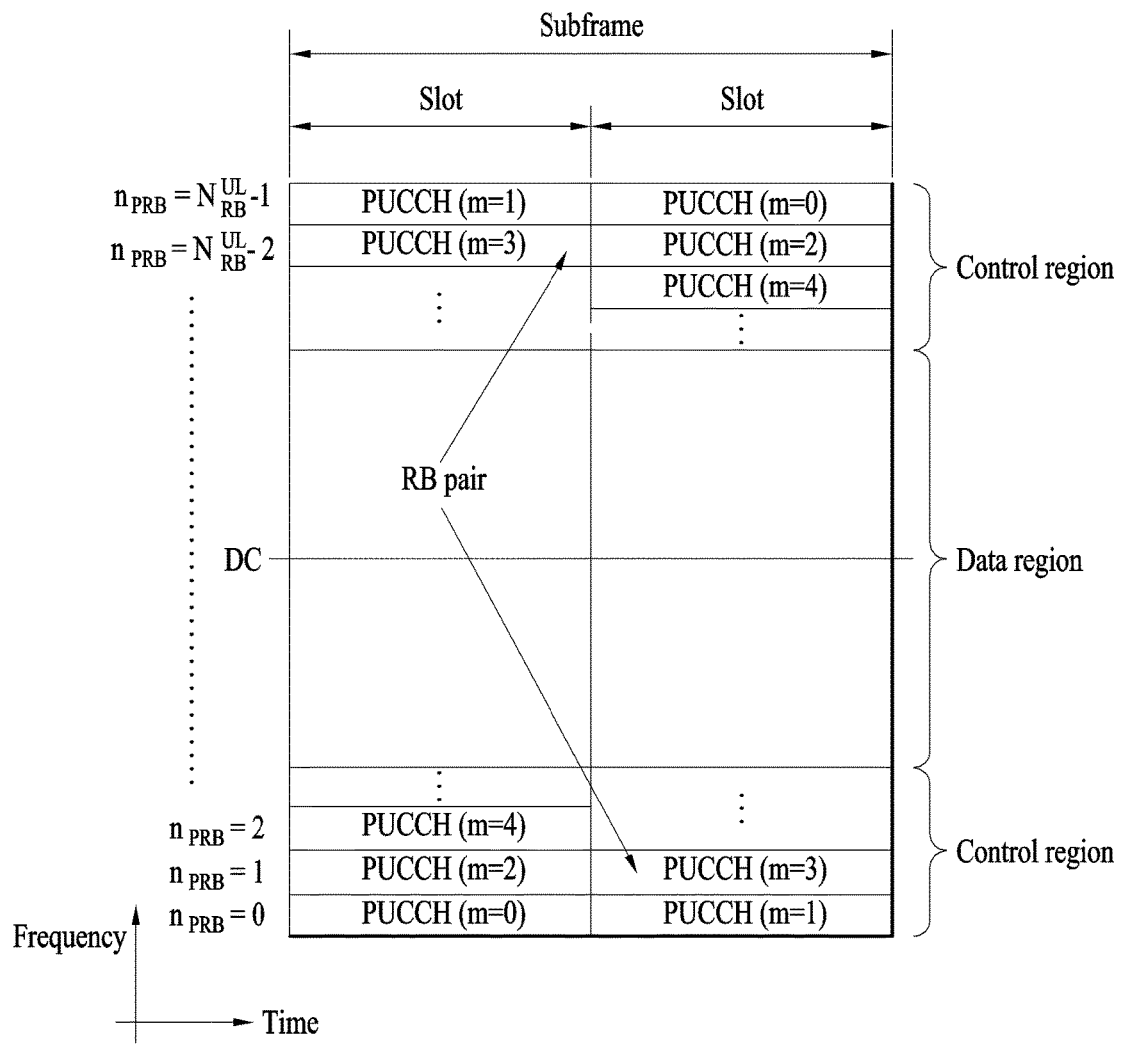
FIG. 6 illustrates the structure of a UL subframe used in a 3GPP LTE/LTE-A system.

FIG. 6 illustrates the structure of a UL subframe used in a 3GPP LTE(-A) system.

Referring to FIG. 6, a UL subframe may be divided into a data region and a control region in the frequency domain. One or several PUCCHs may be allocated to the control region to deliver UCI. One or several PUSCHs may be allocated to the data region of the UE subframe to deliver user data.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

The amount of UCI that can be transmitted by a UE in a subframe depends on the number of SC-FDMA symbols available for control information transmission. SC-FDMA symbols available for UCI correspond to SC-FDMA symbols other than SC-FDMA symbols used for reference signal transmission in a subframe. In the case of a subframe in which an SRS is configured, the last SC-FDMA symbol in the subframe is excluded from the SC-FDMA symbols available for UCI. A reference signal is used for coherent PUCCH detection. A PUCCH supports various formats according to transmitted information.

Table 5 shows a mapping relationship between PUCCH formats and UCI in an LTE/LTE-A system.

TABLE 5

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codewords |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 5, PUCCH format 1 series are mainly used to transmit ACK/NACK information, PUCCH format 2 series are mainly used to carry channel state information (CSI) such as channel quality indicator (CQI)/precoding matrix indicator (PMI)/rank indicator (RI), and PUCCH format 3 series are mainly used to transmit ACK/NACK information.

FIGS. 7 to 11 illustrate UCI transmission using PUCCH format 1 series, PUCCH format 2 series, and PUCCH format 3 series.

In a 3GPP LTE/LTE-A system, a DL/UL subframe having a normal CP consists of two slots each including 7 OFDM symbols and a DL/UL subframe having an extended CP consists of two slots each having 6 OFDM symbols. Since the number of OFDM symbols in each subframe varies with CP length, a structure in which a PUCCH is transmitted in a UL subframe also varies with CP length. Accordingly, a UCI transmission method of a UE in the UL subframe depends on a PUCCH format and CP length.

Figure 7:
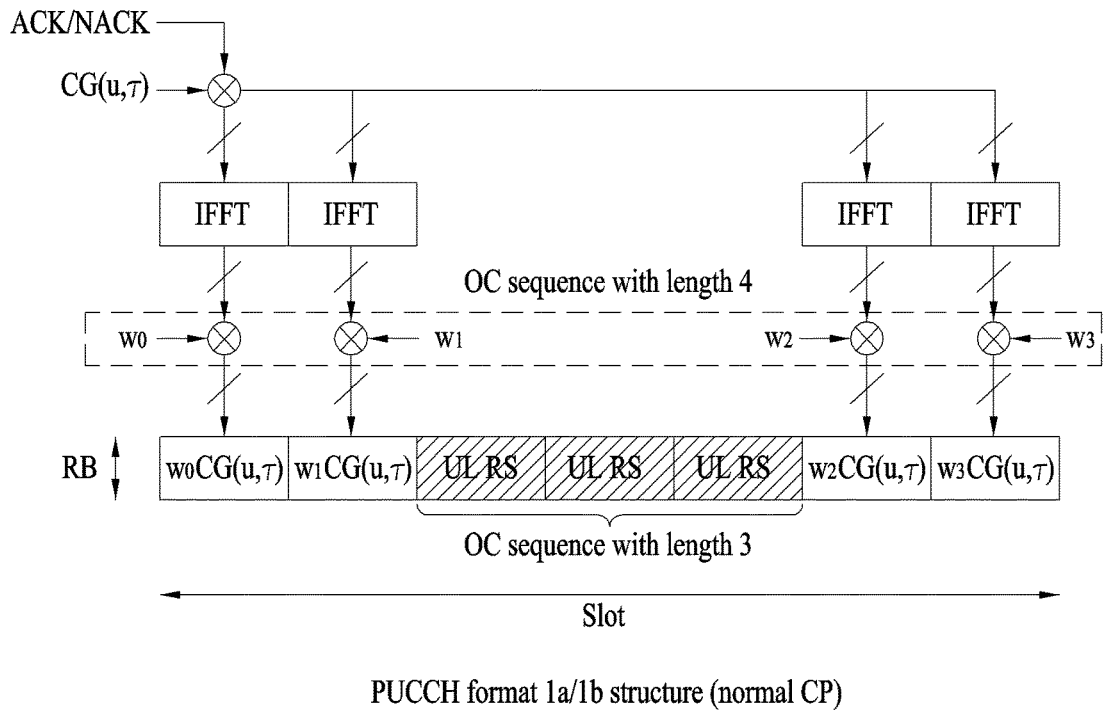
FIGS. 7 to 11 illustrate UCI transmission using physical uplink control channel (PUCCH) format 1 series, PUCCH format 2 series, and PUCCH format 3 series.
Figure 8:
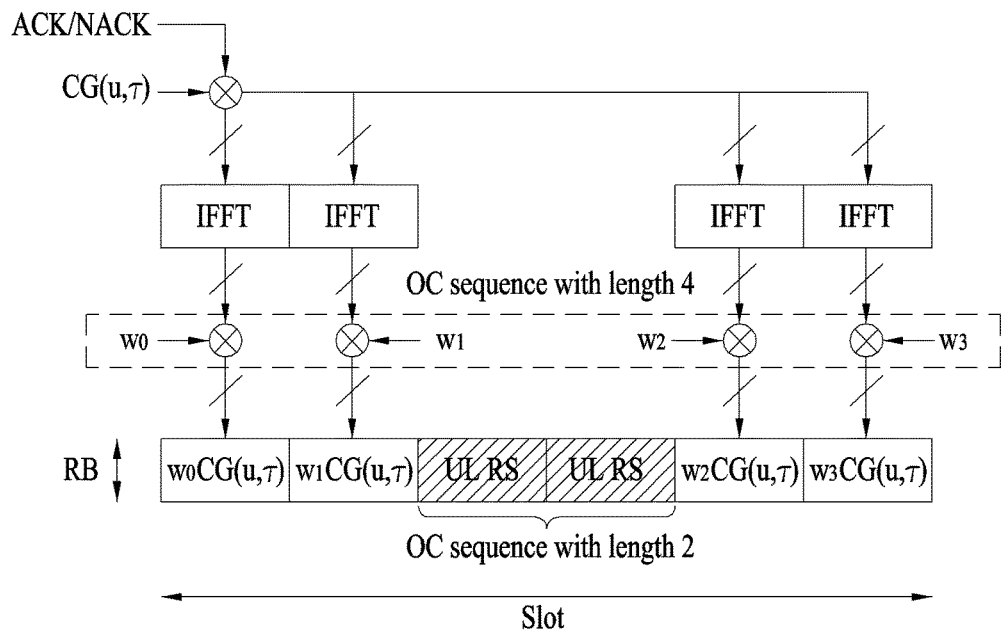

Referring to FIGS. 7 and 8, control information transmitted using PUCCH formats 1a and 1b is repeated with the same contents on a slot basis in a subframe. Each UE transmits an ACK/NACK signal on different resources including different cyclic shifts (frequency domain codes) of a computer-generated constant amplitude zero autocorrelation (CG-CAZAC) sequence and orthogonal covers (OCs) or orthogonal cover codes (OCCs) (time domain spreading codes). An OCC is referred to as an orthogonal sequence. An OC includes, for example, a Walsh/discrete Fourier transform (DFT) OC. Provided that the number of cyclic shifts is 6 and the number of OCs is 3, a total of 18 PUCCHs may be multiplexed in the same physical resource block (PRB) based on a single antenna port. Orthogonal sequences $w_0$, $w_1$, $w_2$ and $w_3$ may be applied in either an arbitrary time domain (after fast Fourier transform (FFT) modulation) or an arbitrary frequency domain (before FFT modulation). In the 3GPP LTE/LTE-A system, PUCCH resources for ACK/NACK transmission are expressed as a combination of a position of a time-frequency resource (e.g. PRB), a cyclic shift of a sequence for frequency spreading, and a (quasi) OC for time spreading and each PUCCH resource is indicated using a PUCCH resource index (also referred to as a PUCCH index). PUCCH format 1 series for scheduling request (SR) transmission is the same in a slot level structure as PUCCH format 1a and 1b and differs only in a modulation method from the PUCCH formats 1a and 1b.

Figure 9:
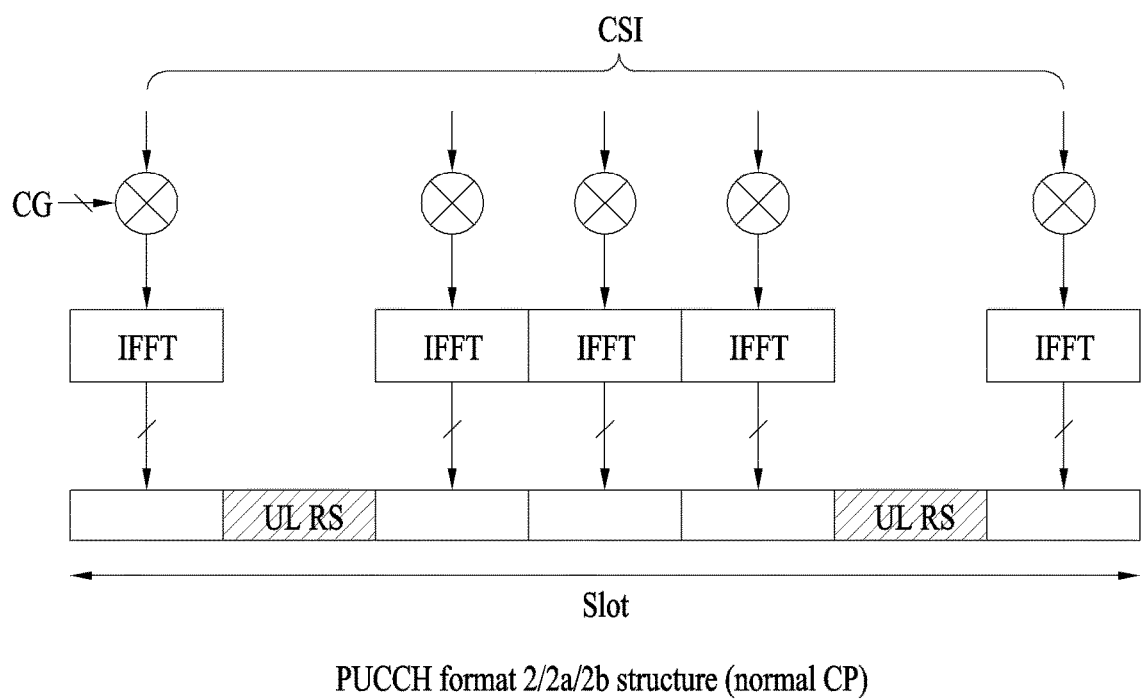
Figure 10:
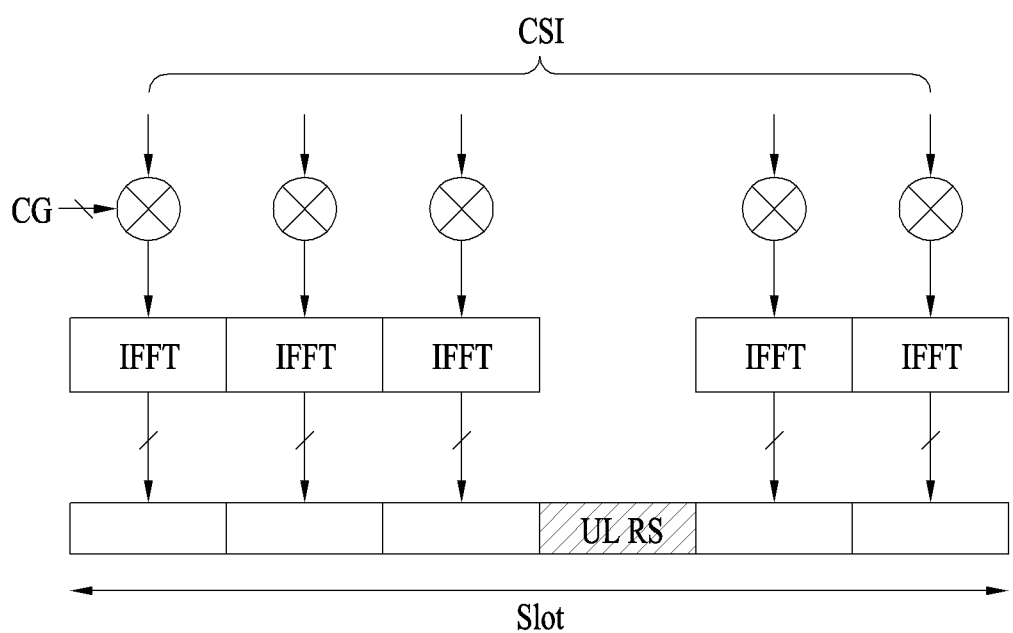

FIG. 9 illustrates an example of transmitting channel state information (CSI) using PUCCH formats 2/2a/2b in a UL slot having a normal CP and FIG. 10 illustrates an example of transmitting CSI using PUCCH formats 2/2a/2b in a UL slot having an extended CP.

Referring to FIGS. 9 and 10, in a normal CP, one UL subframe includes 10 OFDM symbols except for a symbol carrying a UL RS. CSI is coded into 10 transport symbols (also referred to as complex-valued modulation symbols) through block coding. The 10 transport symbols are mapped to the 10 OFDM symbols, respectively, and then are transmitted to an eNB.

PUCCH format 1/1a/1b and PUCCH format 2/2a/2b may carry only up to a predetermined number of bits. However, as carrier aggregation and the number of antennas have increased and a TDD system, a relay system, and a multi-node system have been introduced, the amount of UCI has increased and thus a PUCCH format capable of carrying more UCI than PUCCH format 1/1a/1b/2/2a/2b has been introduced. This format is referred to as PUCCH format 3. For instance, PUCCH format 3 may be used when a UE for which carrier aggregation is configured transmits, through a specific UL carrier, a plurality of ACK/NACK signals for a plurality of PDSCHs received from the eNB through a plurality of DL carriers.

Figure 11:
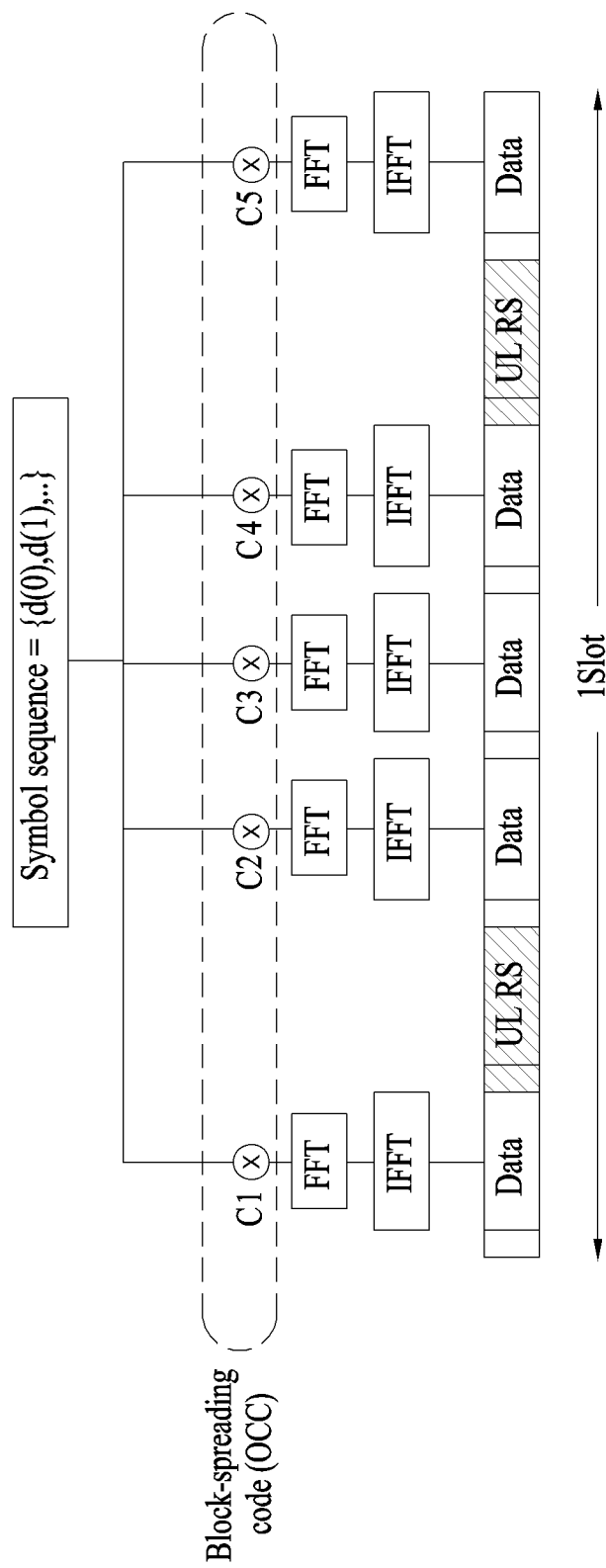

PUCCH format 3 may be configured based on, for example, block-spreading. Referring to FIG. 11, block-spreading is a scheme for spreading a symbol sequence by an OCC (also called an orthogonal sequence) on the time domain and transmitting the spread symbol sequence. According to the block-spreading scheme, control signals of multiple UEs may be multiplexed on the same RB by the OCC and transmitted to an eNB. In PUCCH format 2, one symbol sequence is transmitted over the time domain, and UCI of the UEs is multiplexed using a cyclic shift of a CAZAC sequence and transmitted to the eNB. On the other hand, in a new PUCCH format based on block spreading (hereinafter, PUCCH format 3), one symbol sequence is transmitted over the frequency domain, and the UCI of the UEs is multiplexed using OCC based time-domain spreading and transmitted to the eNB. For example, referring to FIG. 9, one symbol sequence is spread by a length-5 (i.e. spreading factor (SF)=5) OCC and mapped to five SC-FDMA symbols. While a total of two RS symbols is used in one slot in FIG. 11, three RS symbols may be used and an OCC of SF=4 may be used to spread a symbol sequence and multiplex signals of UEs. The RS symbols may be generated by a CAZAC sequence having a specific cyclic shift and may be transmitted to the eNB from the UE in a manner of applying (multiplying) a specific OCC to/by a plurality of RS symbols in the time domain. In FIG. 11, DFT may be applied prior to the OCC and FFT may be applied instead of DFT.

In FIGS. 7 to 11, UL RSs transmitted along with UCI on a PUCCH may be used to demodulate the UCI at the eNB.

Figure 12:
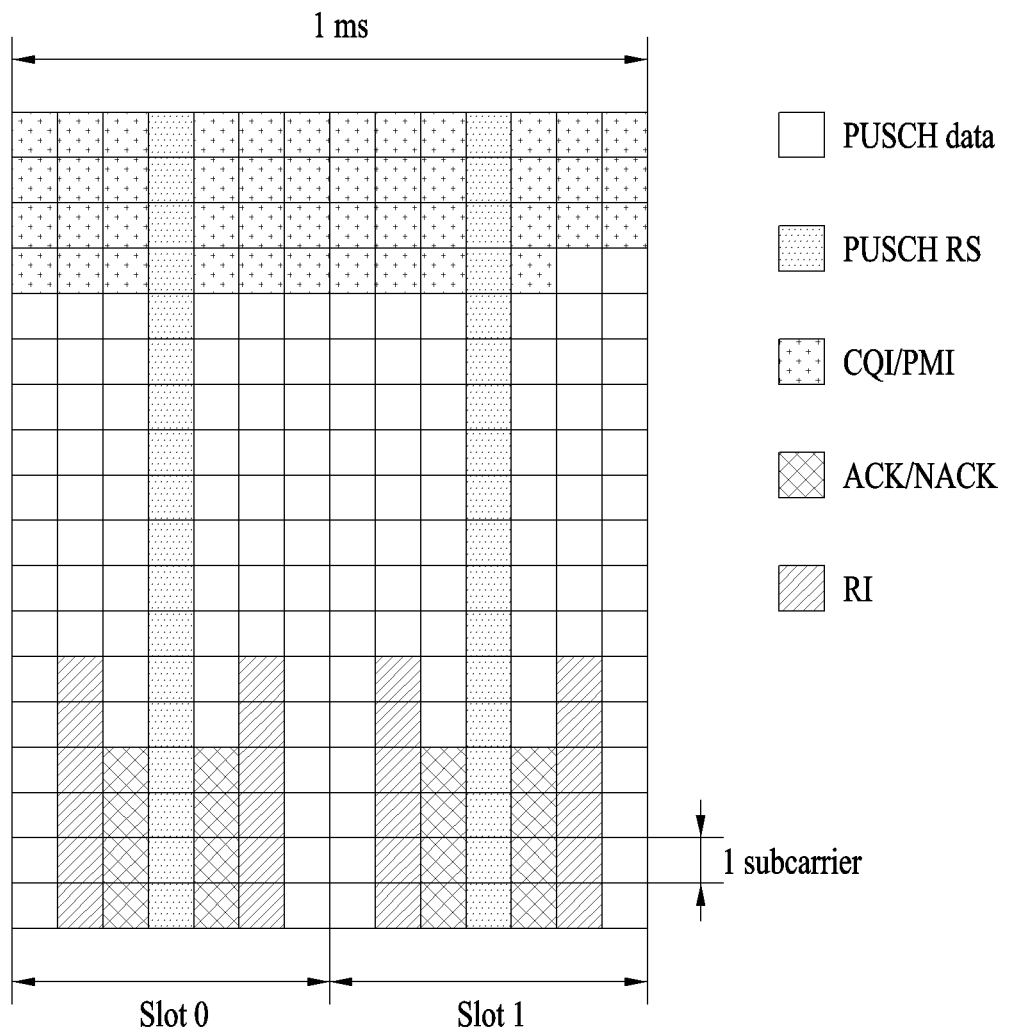
FIG. 12 illustrates multiplexing of UCI and UL data in a physical uplink shared channel (PUSCH) region.

FIG. 12 illustrates multiplexing of UCI and UL data in a PUSCH region.

UL data may be transmitted through a PUSCH in a data region of a UL subframe. A DM RS, which is an RS signal used to demodulate the UL data, may be transmitted together with the UL data in a data region of the UL subframe. Hereinafter, a control region and a data region in the UL subframe will be referred to as a PUCCH region and a PUSCH region, respectively.

If UCI needs to be transmitted in a subframe to which PUSCH transmission is allocated, the UE multiplexes the UCI and UL data (hereinafter, PUSCH data) prior to DFT-spreading and transmits the multiplexed UL signal on a PUSCH, unless simultaneous transmission of a PUSCH and PUCCH is permitted. The UCI includes at least one of CQI/PMI, HARQ ACK/NACK, and RI. The number of REs used for CQI/PMI, ACK/NACK, and RI transmission is based on a modulation and coding scheme (MCS) allocated for PUSCH transmission and on offset values $\Delta^{CQI}_{offset}$, $\Delta^{HARQ\text{-}ACK}_{offset}$, and $\Delta^{RI}_{offset}$. The offset values permit different coding rates according to UCI and are semi-statically configured by higher-layer (e.g. radio resource control (RRC) signaling. The PUSCH data and UCI are not mapped to the same RE. The UCI is mapped to both slots of a subframe.

Referring to FIG. 12, CQI and/or PMI (CQI/PMI) resources are located at the start part of PUSCH data resources. The CQI/PMI resources are sequentially mapped to all SC-FDMA symbols on one subcarrier and then are mapped on the next subcarrier. The CQI/PMI resources are mapped starting from left to right, that is, in the direction of ascending SC-FDMA symbol index, within a subcarrier. The PUSCH data is rate-matched in consideration of the amount of the CQI/PMI resources (i.e. the number of coded symbols). A modulation order which is the same as the modulation order of UL-SCH data is used for CQI/PMI. ACK/NACK is inserted through puncturing part of SC-FDMA resources to which UL-SCH data is mapped. ACK/NACK is located besides a PUSCH RS which is an RS used to demodulate the PUSCH data and is filled starting bottom to top, that is, in the direction of ascending subcarrier index, within an SC-FDMA symbol. In the case of a normal CP, SC-FDMA symbols for ACK/NACK are located at SC-FDMA symbols #2/#5 in each slot as illustrated in FIG. 12. Irrespective of whether ACK/NACK is actually transmitted in a subframe, a coded RI is located next to the symbol for ACK/NACK.

In 3GPP LTE, UCI may be scheduled to be transmitted on a PUSCH without PUSCH data. ACK/NACK, RI, and CQI/PMI may be multiplexed in a similar way to multiplexing as illustrated in FIG. 12. Channel coding and rate matching for control signaling without the PUSCH data are identical to channel coding and rate matching for control signaling with the PUSCH data.

In FIG. 12, the PUSCH RS may be used to demodulate the UCI and/or the PUSCH data transmitted in a PUSCH region. In the present invention, a UL RS associated with PUCCH transmission and a PUSCH RS associated with PUSCH transmission are referred to as a DM RS.

Meanwhile, although not shown in FIG. 12, a sounding reference signal (SRS) may be allocated to a PUSCH region. The SRS is a UL RS not associated with PUSCH or PUCCH transmission. The SRS is transmitted on an OFDM symbol which is located at the last part of a UL subframe in the time domain and on a data transmission band of the UL subframe, that is, on the PUSCH region, in the frequency domain. The eNB may measure a UL channel state between the UE and the eNB using the SRS. SRSs of multiple UEs transmitted/received on the last OFDM symbol of the same subframe may be distinguished according to a frequency location/sequence.

Since the UL RS, the PUSCH RS, and the SRS are UE-specifically generated by a specific UE and are transmitted to the eNB, theses signals may be called UL UE-specific RSs.

An RS sequence $r^{(\alpha)}_{u,v}(n)$ is defined by a cyclic shift $\alpha$ of a base sequence $r_{u,v}(n)$.

$$r_{u,v}^{(\alpha)}(n)=e^{j\alpha n}\cdot r_{u,v}(n),\ 0\le n<M_{sc}^{RS} \quad\text{[Equation 5]}$$

In Equation 5, $M^{RS}_{sc}=m\cdot N^{RB}_{sc}$ is the length of the reference signal sequence and $1\le m\le N^{max,UL}_{RB}$. $N^{max,UL}_{RB}$ is the largest UL bandwidth configuration, expressed in multiples of $N^{RB}_{sc}$.

Base sequences $r_{u,v}(n)$ are divided into groups. In $r_{u,v}(n)$, $u\in\{0, 1, \ldots, 29\}$ is the group number (i.e. group index), v is the base sequence number within the group (i.e. base sequence index). Each base sequence group may contain one base sequence (v=0) of each length $M^{RS}_{sc}=m\cdot N^{RB}_{sc}$ ($1\le m\le5$) and two base sequences of each length $M^{RS}_{sc}=m\cdot N^{RB}_{sc}$ ($6\le m\le N^{max,UL}_{RB}$). The sequence group number u and the number v within the group may vary in time.

A base sequence having a length of longer than $3N^{RB}_{sc}$ can be defined as follows. For $M^{RS}_{sc}\ge 3N^{RB}_{sc}$, base sequence $\bar{r}_{u,v}(0),\ldots,\bar{r}_{u,v}(M^{RS}_{sc}-1)$ is given by the following Equation 6.

$$\bar{r}_{u,v}(n)=x(n\bmod N_{ZC}^{RS}),\ 0\le n<M_{sc}^{RS} \quad\text{[Equation 6]}$$

Here, the q-th root Zadoff-Chu sequence can be defined by the following Equation 7.

$$x_q(m) = e^{-j\frac{\pi qm(m+1)}{N_{ZC}^{RS}}}, \quad\text{[Equation 7]}$$
$$0 \le m \le N_{ZC}^{RS} - 1$$

Here, q satisfies the following Equation 8.

$$q=\lfloor\bar{q}+\tfrac{1}{2}\rfloor+v\cdot(-1)^{\lfloor 2\bar{q}\rfloor}$$

$$\bar{q}=N_{ZC}^{RS}\cdot(u+1)/31 \quad\text{[Equation 8]}$$

The length $N^{RS}_{ZC}$ of the Zadoff-Chue sequence is given by the largest prime number, and thus $N^{RS}_{ZC}<M^{RS}_{sc}$ is satisfied.

A base sequence having a length of less than $3N_{sc}^{RB}$ can be defined as follows. The base sequence is given by the following Equation 9 for $M_{sc}^{RS}=N_{sc}^{RB}$ and $M_{sc}^{RS}=2N_{sc}^{RB}$.

$$\bar{r}_{u,v}(n)=e^{j\phi(n)\pi/4},\ 0\leq n\leq M_{sc}^{RS}-1 \quad \text{[Equation 9]}$$

Here, for $M_{sc}^{RS}=N_{sc}^{RB}$ and $M_{sc}^{RS}=2N_{sc}^{RB}$, $\phi(n)$ is given as shown in Tables 6 and 7, respectively.

TABLE 6

| u | φ(0), . . . , φ(11) | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -1 | 3 | -3 | 1 | -3 | 3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

Meanwhile, RS hopping will now be described.

The sequence-group number u in slot $n_s$ is defined by a group hopping pattern $f_{gh}(n_s)$ and a sequence-shift pattern $f_{ss}$ according to the following equation.

$$u=(f_{gh}(n_s)+f_{ss})\bmod 30 \quad \text{[Equation 10]}$$

Where mod indicates modulo operation.

There are plural different (e.g. 17) hopping patterns and plural different (e.g. 30) sequence shift patterns. Sequence-group hopping can be enabled or disabled by a cell-specific parameter provided by higher layers.

The group-hopping pattern $f_{gh}(n_s)$ may be given for PUSCH and PUCCH by the following equation.

$$f_{gh}(n_s) = \begin{cases} 0 & \text{if group hopping is disabled} \\ \left(\sum_{i=0}^{7} c(8n_s+i)\cdot 2^i\right)\bmod 30 & \text{if group hopping is enabled} \end{cases} \quad \text{[Equation 11]}$$

In Equation 11, the pseudo-random sequence c(i) is defined by Equation 2. The pseudo-random sequence generator is initialized with $c_{init}$ according to the following equation at the beginning of each radio frame.

$$c_{init} = \left\lfloor \frac{N_{ID}^{cell}}{30} \right\rfloor \quad \text{[Equation 12]}$$

According to the current 3GPP LTE(-A) standards, the group-hopping pattern is the same for PUSCH and PUCCH according to Equation 11, but the sequence-shift pattern differs between PUCCH and PUSCH.

For PUCCH, the sequence-shift pattern $f_{ss}^{PUCCH}$ is given by the following equation based on the cell ID.

$$f_{ss}^{PUCCH}=N_{ID}^{cell}\bmod 30 \quad \text{[Equation 13]}$$

TABLE 7

| u | φ(0), . . . , φ(23) | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

A sequence shift pattern for a PUSCH $f^{PUSCH}_{ss}$ is given by the following equation using a sequence shift pattern $f^{PUCCH}_{ss}$ for a PUCCH and a value ($\Delta_{ss}$) configured by higher layers.

$$f_{ss}^{PUSCH} = (f_{ss}^{PUCCH} + \Delta_{ss}) \bmod 30 \quad \text{[Equation 14]}$$

In Equation 14, $\Delta_{ss} \in \{0, 1, \ldots, 29\}$.

Sequence hopping will now be described.

Sequence hopping only applies for reference signals of length $M_{sc}^{RS} \geq 6N_{sc}^{RB}$.

For reference signals of length $M_{sc}^{RS} < 6N_{sc}^{RB}$, the base sequence number v within the base sequence group is given by v =0.

For reference signals of length $M_{sc}^{RS} \geq 6N_{sc}^{RB}$, the base sequence number v within the base sequence group in slot $n_s$ is given by the following Equation 15.

$$v = \begin{cases} c(n_s) & \text{if group hopping is disabled} \\ & \text{and sequence hopping is enabled} \\ 0 & \text{otherwise} \end{cases} \quad \text{[Equation 15]}$$

Here, c(i) corresponds to the pseudo-random sequence and a parameter that is provided by higher layers and enables sequence hopping determines if sequence hopping is enabled or not. The pseudo-random sequence generator may be initialized with $C_{int}$ at the beginning of each radio frame.

$$c_{init} = \left\lfloor \frac{N_{ID}^{cell}}{30} \right\rfloor \cdot 2^5 + f_{ss}^{PUSCH} \quad \text{[Equation 16]}$$

Cyclic shift (CS) applied to all PUCCH formats shown in FIGS. 7 to 11 will hereinafter be described in detail. All PUCCH formats may use a cell-specific cyclic shift, $n^{cell}_{cs}(n_s,l)$, which varies with the symbol number l and the slot number $n_s$ according to the following equation.

$$n_{cs}^{cell}(n_s,l) = \sum_{i=0}^{7} c(8N_{symb}^{UL} \cdot n_s + 8l + i) \cdot 2^i \quad \text{[Equation 17]}$$

In Equation 17, the pseudo-random sequence c(i) may correspond to Equation 2, and may be initialized as shown in the following equation 18 whenever each radio frame begins.

$$c_{init} = N_{ID}^{cell} \quad \text{[Equation 18]}$$

In case of PUCCH format 1, necessary information can be transferred using specific information indicating the presence/absence of PUCCH received from the UE. In case of PUCCH format 1, it is assumed that a complex symbol d(0) is set to 1 (i.e., d(0)=1). In case of PUCCH formats 1a and 1b, one or two explicit bits can be transmitted, respectively. Blocks b(0), . . . , b($M_{bit}$–1) of individual bits are modulated according to the following table 8, resulting in a complex symbol d(0).

TABLE 8

| PUCCH format | b(0), . . . , b($M_{bit}$ – 1) | d(0) |
| --- | --- | --- |
| 1a | 0 | 1 |
|  | 1 | −1 |
| 1b | 00 | 1 |
|  | 01 | −j |
|  | 10 | j |
|  | 11 | −1 |

In association with each of P antenna ports to be used for PUCCH transmission, a sequence having a cyclic shift (CS) length of $N_{seq}^{PUCCH}=12$ is multiplied by the complex symbol as shown in the following equation 19, resulting in creation of a cyclic-shifted complex symbol sequence.

$$y^{(\tilde{p})}(n) = \frac{1}{\sqrt{P}} d(0) \cdot r_{u,v}^{(\alpha_{\tilde{p}})}(n), \quad \text{[Equation 19]}$$

$$n = 0, 1, \ldots, N_{seq}^{PUCCH} - 1$$

$r_{u,v}^{(\alpha_{\tilde{p}})}(n)$ can be obtained in the same manner as in the case of $M_{sc}^{RS} = N_{seq}^{PUCCH}$ shown in Equation 5. An antenna-port specific cyclic shift $\alpha_{\tilde{p}}$ is changed according to symbols and slots (i.e., according to symbol numbers and slot numbers), and may be decided by the following equations 20 and 21.

$$\alpha_{\tilde{p}}(n_s, l) = 2\pi \cdot \bar{n}_{cs}^{(\tilde{p})}(n_s, l) / N_{sc}^{RB} \quad \text{[Equation 20]}$$

$$\bar{n}_{cs}^{(\tilde{p})}(n_s, l) = \begin{cases} \left[ \begin{array}{c} n_{cs}^{cell}(n_s, l) + \\ \left( \begin{array}{c} n_{\tilde{p}}'(n_s) \cdot \Delta_{shift}^{PUCCH} + \\ (\bar{n}_{oc}^{(\tilde{p})}(n_s) \bmod \Delta_{shift}^{PUCCH}) \end{array} \right) \bmod N' \end{array} \right] \bmod N_{sc}^{RB} & \text{for normal cyclic prefix} \\ \left[ \begin{array}{c} n_{cs}^{cell}(n_s, l) + \\ (n_{\tilde{p}}'(n_s) \cdot \Delta_{shift}^{PUCCH} + \bar{n}_{oc}^{(\tilde{p})}(n_s)) \bmod N' \end{array} \right] \bmod N_{sc}^{RB} & \text{for extended cyclic prefix} \end{cases} \quad \text{[Equation 21]}$$

$$n_{oc}^{(\tilde{p})}(n_s) = \begin{cases} \lfloor n_{\tilde{p}}'(n_s) \cdot \Delta_{shift}^{PUCCH} / N' \rfloor & \text{for normal cyclic prefix} \\ 2 \cdot \lfloor n_{\tilde{p}}'(n_s) \cdot \Delta_{shift}^{PUCCH} / N' \rfloor & \text{for extended cyclic prefix} \end{cases} \quad \text{[Equation 22]}$$

In Equation 22, N' and c may be denoted by the following equation 23.

$$N' = \begin{cases} N_{cs}^{(1)} & \text{if } n_{PUCCH}^{(1,\tilde{p})} < c \cdot N_{cs}^{(1)} / \Delta_{shift}^{PUCCH} \\ N_{sc}^{RB} & \text{otherwise} \end{cases} \quad \text{[Equation 23]}$$

$$c = \begin{cases} 3 & \text{normal cyclic prefix} \\ 2 & \text{extended cyclic prefix} \end{cases}$$

In Equation 23, $\Delta_{shift}^{PUCCH}$ is a parameter received from a higher layer.

Blocks $y^{(\tilde{p})}(0), \ldots, y^{(\tilde{p})}(N_{seq}^{PUCCH}-1)$ of the above complex symbol are scrambled into $S(n_s)$, and is blockwise-spread as an antenna-port specific orthogonal sequence $w_{n_{oc}(\tilde{p})}(i)$, and the set of complex symbols is generated through the following equation 24.

$$z^{(\tilde{p})}(m' \cdot N_{SF}^{PUCCH} \cdot N_{seq}^{PUCCH} + m \cdot N_{seq}^{PUCCH} + n) = S(n_s) \cdot w_{n_{oc}(\tilde{p})}(m) \cdot y^{(\tilde{p})}(n) \qquad \text{[Equation 24]}$$

In Equation 24, if $m=0, \ldots, N_{SF}^{PUCCH}-1$, $n=0, \ldots, N_{seq}^{PUCCH}-1$, and $m'=0, 1$ are given, $S(n_s)$ is denoted by the following equation 25.

$$S(n_s) = \begin{cases} 1 & \text{if } n'_{\tilde{p}}(n_s) \bmod 2 = 0 \\ e^{j\pi/2} & \text{otherwise} \end{cases} \qquad \text{[Equation 25]}$$

In case of both slots of general PUCCH formats 1/1a/1b, $N_{SF}^{PUCCH}=4$ is decided. In case of a first slot of shortened PUCCH formats 1/1a/1b, $N_{SF}^{PUCCH}=4$ is decided. In case of a second slot of the shortened PUCCH formats 1/1a/1b, $N_{SF}^{PUCCH}=3$ is decided. The orthogonal sequence $w_{n_{oc}(\tilde{p})}(i)$ in case of $N_{SF}^{PUCCH}=4$ (shown in Table 9) is different from the orthogonal sequence $w_{n_{oc}(\tilde{p})}(i)$ in case of $N_{SF}^{PUCCH}=3$ (shown in Table 10), as denoted by the following tables 9 and 10.

TABLE 9

| Sequence index $n_{oc}^{(\tilde{p})}(n_s)$ | Orthogonal sequences [w(0) ... w($N_{SF}^{PUCCH}-1$)] |
|---|---|
| 0 | [+1 +1 +1 +1] |
| 1 | [+1 −1 +1 −1] |
| 2 | [+1 −1 −1 +1] |

TABLE 10

| Sequence index $n_{oc}^{(\tilde{p})}(n_s)$ | Orthogonal sequences [w(0) ... w($N_{SF}^{PUCCH}-1$)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

In addition, resources for use in transmission of PUCCH formats 1/1a/1b are identified by a resource index $n_{PUCCH}^{(1,\tilde{p})}$. Resource indexes of two resource blocks for use in two slots of a subframe mapped to PUCCH are denoted by the following equation. Equation 26 may correspond to an even slot (i.e., $n_s \bmod 2=0$), and Equation 27 may correspond to an odd slot (i.e., $n_s \bmod 2=1$).

In this case, $h_{\tilde{p}} = (n'_{\tilde{p}}(n_s-1)+d) \bmod (cN'/\Delta_{shift}^{PUCCH})$ is given. In case of a normal CP, $d=2$ is decided. In case of an extended CP, $d=0$ is decided.

In case of PUCCH formats 2/2a/2b, blocks $b(0), \ldots, b(19)$ of individual bits are scrambled into a UE-specific scrambling sequence, and blocks $\tilde{b}(0), \ldots, \tilde{b}(19)$ of the scrambled bits are generated as shown in the following equation 28.

$$\tilde{b}(i) = (b(i) + c(i)) \bmod 2 \qquad \text{[Equation 28]}$$

In this case, the scrambling sequence (i.e., a pseudo-random sequence) may correspond to Equation 2, and the scrambling sequence generator is initialized as the following value $c_{init}$ whenever each subframe begins.

$$c_{init} = (\lfloor n_s/2 \rfloor + 1) \cdot (2N_{ID}^{cell} + 1) \cdot 2^{16} + n_{RNTI} \qquad \text{[Equation 29]}$$

In Equation 29, $n_{RNTI}$ may correspond to C-RNTI.

Blocks $\tilde{b}(0), \ldots, \tilde{b}(19)$ of the scrambled bits are QPSK-modulated, resulting in creation of complex modulation symbols $d(0), \ldots, d(9)$. The sequence $r_{u,v}^{(\alpha_{\tilde{p}})}(n)$ corresponding to the cyclic shift (CS) length ($N_{seq}^{PUCCH}=12$) for each of P antenna ports for PUCCH transmission is multiplied by the complex modulation symbols $d(0), \ldots, d(9)$, so that the following complex symbols can be generated as represented by Equation 30.

$$z^{(\tilde{p})}(N_{seq}^{PUCCH} \cdot n + i) = \frac{1}{\sqrt{P}} d(n) \cdot r_{u,v}^{(\alpha_{\tilde{p}})}(i) \qquad \text{[Equation 30]}$$

$$n = 0, 1, \ldots, 9$$

$$i = 0, 1, \ldots, N_{sc}^{RB} - 1$$

$r_{u,v}^{(\alpha_{\tilde{p}})}(i)$ can be obtained in the same manner as in the case of $M_{sc}^{RS} = N_{seq}^{PUCCH}$ shown in Equation 5.

Meanwhile, resources for PUCCH formats 2/2a/2b transmission are identified by the resource index $n_{PUCCH}^{(2,\tilde{p})}$ for deciding the cyclic shift (CS) $\alpha_{\tilde{p}}(n_s,l)$, as represented by the following equations.

$$\alpha_{\tilde{p}}(n_s,l) = 2\pi \cdot n_{cs}^{(\tilde{p})}(n_s,l)/N_{sc}^{RB} \qquad \text{[Equation 31]}$$

$n_{cs}^{(\tilde{p})}(n_s,l)$ can be obtained through the following equation 32, and $N_{sc}^{RB}$ is identical to the size of a resource block, i.e., the number of subcarriers contained in a resource block.

$$n_{cs}^{(\tilde{p})}(n_s,l) = (n_{cs}^{cell}(n_s,l) + n'_{\tilde{p}}(n_s)) \bmod N_{sc}^{RB} \qquad \text{[Equation 32]}$$

In this case, $n'_{\tilde{p}}(n_s)$ is changed according to slots, and an even slot can be represented by the following equation 33.

$$n'_{\tilde{p}}(n_s) = \qquad \text{[Equation 33]}$$

$$\begin{cases} n_{PUCCH}^{(2,\tilde{p})} \bmod N_{sc}^{RB} & \text{if } n_{PUCCH}^{(2,\tilde{p})} < N_{sc}^{RB} N_{RB}^{(2)} \\ (n_{PUCCH}^{(2,\tilde{p})} + N_{cs}^{(1)} + 1) \bmod N_{sc}^{RB} & \text{otherwise} \end{cases}$$

In case of an odd slot, $n'_{\tilde{p}}(n_s)$ can be represented by the following equation 34.

$$n'_{\tilde{p}}(n_s) = \begin{cases} n_{PUCCH}^{(1,\tilde{p})} & \text{if } n_{PUCCH}^{(1,\tilde{p})} < c \cdot N_{cs}^{(1)}/\Delta_{shift}^{PUCCH} \\ (n_{PUCCH}^{(1,\tilde{p})} - c \cdot N_{cs}^{(1)}/\Delta_{shift}^{PUCCH}) \bmod (c \cdot N_{sc}^{RB}/\Delta_{shift}^{PUCCH}) & \text{otherwise} \end{cases} \qquad \text{[Equation 26]}$$

$$n'_{\tilde{p}}(n_s) = \begin{cases} [c(n'_{\tilde{p}}(n_s-1)+1)] \bmod (cN_{sc}^{RB}/\Delta_{shift}^{PUCCH} + 1) - 1 & n_{PUCCH}^{(1,\tilde{p})} \geq c \cdot N_{cs}^{(1)}/\Delta_{shift}^{PUCCH} \\ \lfloor h_{\tilde{p}}/c \rfloor + (n_{\tilde{p}} \bmod c) N'/\Delta_{shift}^{PUCCH} & \text{otherwise} \end{cases} \qquad \text{[Equation 27]}$$

$$n'_p(n_s) = \begin{cases} [N_{sc}^{RB}(n'_p(n_s-1)+1)] \bmod (N_{sc}^{RB}+1) - 1 & \text{if } n_{PUCCH}^{(2,\tilde{p})} < N_{sc}^{RB} N_{RB}^{(2)} \\ (N_{sc}^{RB} - 2 - n_{PUCCH}^{(2,\tilde{p})}) \bmod N_{sc}^{RB} & \text{otherwise} \end{cases}$$

[Equation 34]

UCI bits $b(20), \ldots, b(M_{bit}-1)$ for PUCCH formats 2a and 2b supported for the normal CP only are modulated as shown in the following table 11, so that a single modulation symbol $d(10)$ for generating a reference signal (RS) for PUCCH formats 2a/2b is obtained.

TABLE 11

| PUCCH format | $b(20), \ldots, b(M_{bit}-1)$ | $d(10)$ |
|---|---|---|
| 2a | 0 | 1 |
|  | 1 | −1 |
| 2b | 00 | 1 |
|  | 01 | −j |
|  | 10 | j |
|  | 11 | −1 |

PUCCH Format 3 will now be described. If slot-level frequency hopping is not performed, the multiplexing capacity may be doubled again by further applying spreading or covering (e.g. Walsh covering) in slot units. If slot-level frequency hopping is performed, application of Walsh covering in slot units may not maintain orthogonality due to a channel condition experienced in each slot. A slot-level spreading code (e.g. OCC) for RSs may include, without being limited to, a Walsh cover of [x1 x2]=[1 1] or [1 −1] or linear transformation thereof (e.g. [j j] [j −j], [1 j] [1 −j], etc.). x1 is applied to the first slot and x2 is applied to the second slot. While figures show SC-FDMA symbol-level spreading (or covering) after slot-level spreading (or covering), a spreading (or covering) order may be changed.

The signal processing procedure of PUCCH Format 3 will now be described using equations. For convenience, it is assumed that a length-5 OCC is used.

The block of bits $b(0), \ldots, b(M_{bit}-1)$ is scrambled with a UE-specific scrambling sequence. The block of bits $b(0), \ldots, b(M_{bit}-1)$ may be corresponding to coded bits $b\_0, b\_1, \ldots, b\_N-1$. The block of bits $b(0), \ldots, b(M_{bit}-1)$ includes at least one of ACK/NACK bit, CSI bit, SR bit. A block of scrambled bits $\tilde{b}(0), \ldots, \tilde{b}(M_{bit}-1)$ may be generated by the equation below.

$$\tilde{b}(i) = (b(i) + c(i)) \bmod 2$$

[Equation 35]

where $c(i)$ denotes the scrambling sequence. $c(i)$ includes pseudo-random sequences are defined by a length-31 Gold sequence and may be generated by the following equation where mod denotes the modulo operation.

The block of scrambled bits $\tilde{b}(0), \ldots, \tilde{b}(M_{bit}-1)$ is modulated, resulting in a block of complex-valued modulation symbols $d(0), \ldots, d(M_{symb}-1)$. When QPSK modulated, $M_{symb} = M_{bit}/2 = 2N_{sc}^{RB}$.

The complex-valued modulation symbols $d(0), \ldots, d(M_{symb}-1)$ are blockwise spread with the orthogonal sequence $w_{n_{oc}}(i)$ resulting in $N_{SF,0}^{PUCCH} + N_{SF,1}^{PUCCH}$ sets of complex-valued symbols according to the following equation. The divide/spread procedure is performed by the following equation. Each complex-valued symbol is corresponding to an SC-FDMA symbol, and has $N_{sc}^{RB}$ complex-valued modulation values (e.g. 12 complex-valued modulation values).

$$y_n(i) = \begin{cases} w_{n_{oc},0}(\bar{n}) \cdot e^{j\pi \lfloor v_{cs}^{cell}(n_s,l)/64 \rfloor/2} \cdot d(i) & n < N_{SF,0}^{PUCCH} \\ w_{n_{oc},1}(\bar{n}) \cdot e^{j\pi \lfloor v_{cs}^{cell}(n_s,l)/64 \rfloor/2} \cdot d(N_{sc}^{RB}+i) & \text{otherwise} \end{cases}$$

[Equation 36]

$\bar{n} = n \bmod N_{SF,0}^{PUCCH}$ $n = 0, \ldots, N_{SF,0}^{PUCCH} + N_{SF,1}^{PUCCH} - 1$ $i = 0, 1, \ldots, N_{sc}^{RB} - 1$ Here, $N_{SF,0}^{PUCCH}$ and $N_{SF,1}^{PUCCH}$ correspond to the number of SC-FDMA symbols used for PUCCH transmission at slot 0 and slot 1, respectively. $N_{SF,0}^{PUCCH} = N_{SF,1}^{PUCCH} = 5$ for both slots in a subframe using normal PUCCH format 3 and $N_{SF,0}^{PUCCH}=5$, $N_{SF,1}^{PUCCH}=4$ holds for the first and second slot, respectively, in a subframe using shortened PUCCH format 3. $w_{n_{oc},0}(i)$ and $w_{n_{oc},1}(i)$ indicate orthogonal sequences applied to slot 0 and slot 1, respectively and are given by Table 12 shown below. $n_{oc}$ denotes an orthogonal sequence index (or an orthogonal code index). $\lfloor \; \rfloor$ denotes a flooring function. $n_{cs}^{cell}(n_s,l)$ may be given by Equation 17.

Table 12 shows a sequence index $n_{oc}$ and an orthogonal sequence $w_{n_{oc}}(i)$.

TABLE 12

| Sequence index | Orthogonal sequence $[w_{n_{oc}}(0) \ldots w_{n_{oc}}(N_{SF}^{PUCCH}-1)]$ | |
|---|---|---|
| $n_{oc}$ | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

Resources used for transmission of PUCCH formats 3 are identified by a resource index $n_{PUCCH}^{(3)}$. For example, $n_{oc}$ may be given by $n_{oc} = n_{PUCCH}^{(3)} \bmod N_{SF,1}^{PUCCH}$. $n_{PUCCH}^{(3)}$ may be indicated through a Transmit Power Control (TPC) field of an SCell PDCCH. More specifically, $n_{oc}$ for each slot may be given the following equation.

$$n_{oc,0} = n_{PUCCH}^{(3)} \bmod N_{SF,1}^{PUCCH}$$

$$n_{oc,1} = \begin{cases} (3n_{oc,0}) \bmod N_{SF,1}^{PUCCH} & \text{if } N_{SF,1}^{PUCCH} = 5 \\ n_{oc,0} \bmod N_{SF,1}^{PUCCH} & \text{otherwise} \end{cases}$$

[Equation 37]

where $n_{oc,0}$ denotes a sequence index value $n_{oc}$ for slot 0 and $n_{oc,1}$ denotes a sequence index value $n_{oc}$ for slot 1. In case of normal PUCCH Format 3, $N_{SF,0}^{PUCCH} = N_{SF,1}^{PUCCH} = 5$. In case of shortened PUCCH Format 3, $N_{SF,0}^{PUCCH}=5$ and $N_{SF,1}^{PUCCH}=4$.

Each set of complex-valued symbols may be cyclically shifted according to following equation.

$$\tilde{y}_n(i) = y_n((i+n_{cs}^{cell}(n_s,l)) \bmod N_{sc}^{RB})$$

[Equation 38]

where $n_s$ denotes a slot number in a radio frame and l denotes an SC-FDMA symbol number in a slot. $n_{cs}^{cell}(n_s,l)$ is defined by Equation 17. n=0, ..., $N_{SF,0}^{PUCCH}+N_{SF,1}^{PUCCH}-1$.

The shifted sets of complex-valued symbols are transform precoded according to the following equation, resulting a block of complex-valued symbols z(0), ..., z$((N_{SF,0}^{PUCCH}+N_{SF,1}^{PUCCH})N_{sc}^{RB}-1)$.

$$z(n \cdot N_{sc}^{RB} + k) = \frac{1}{\sqrt{P}} \frac{1}{\sqrt{N_{sc}^{RB}}} \sum_{i=0}^{N_{sc}^{RB}-1} y_n(i) e^{-j\frac{2\pi i k}{N_{sc}^{RB}}}$$ [Equation 39]

$k = 0, \ldots, N_{sc}^{RB} - 1$ $n = 0, \ldots, N_{SF,0}^{PUCCH} + N_{SF,1}^{PUCCH} - 1$ Where P is the number of antenna ports used to transmit PUCCH. Complex symbol blocks z(0), ..., z$((N_{SF,0}^{PUCCH}+N_{SF,1}^{PUCCH})N_{sc}^{RB}-1)$ are mapped to physical resources after power control. A PUCCH uses one resource block in each slot of a subframe. In the resource block, z(0), ..., z$((N_{SF,0}^{PUCCH}+N_{SF,1}^{PUCCH})N_{sc}^{RB}-1)$ are mapped to a resource element (k,l) which is not used for RS transmission (see Table 14). Mapping is performed in ascending order of k, l, and a slot number, starting from the first slot of a subframe. k denotes a subcarrier index and l denotes an SC-FDMA symbol index in a slot.

A sequence $r^{(p)}_{PUCCH}(\cdot)$ of a UL RS of FIGS. 7 to 11 (hereinafter, a PUCCH DM RS) is given by $$r^{(p)}_{PUCCH}(m'N_{RS}^{PUCCH}M_{sc}^{RS} + mM_{sc}^{RS} + n) =$$ [Equation 40]
$$\frac{1}{\sqrt{P}} \tilde{w}^{(p)}(m) z(m) r_{u,v}^{(\alpha_p)}(n)$$

In Equation 40, m=0, ..., $N^{PUCCH}_{RS-1}$, n=0, ..., $M^{RS}_{sc}-1$, and m'=0,1. $N^{PUCCH}_{RS}$ is the number of reference symbols per slot for PUCCH. P is the number of antenna ports used for PUCCH transmission. The sequence $r^{(\alpha_p)}_{u,v}(n)$ is given by Equation 5 with $M^{RS}_{sc}=12$ where the cyclic shift $\alpha_p$ is determined by the PUCCH format.

In more detail, in case of PUCCH formats 1/1a/1b, the cyclic shift (CS) is decided by the above equations 20 to 23, and the number $N_{RS}^{PUCCH}$ of reference signals (RSs) for each slot and the orthogonal sequence $\tilde{w}(n)$ are shown in the following tables 13 and 14.

TABLE 13

| PUCCH format | Normal cyclic prefix | Extended cyclic prefix |
|---|---|---|
| 1, 1a, 1b | 3 | 2 |
| 2, 3 | 2 | 1 |
| 2a, 2b | 2 | N/A |

TABLE 14

| Sequence index $\bar{n}_{oc}^{(p)}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

In case of PUCCH formats 2/2a/2b, the cyclic shift (CS) $\alpha_{\tilde{p}}(n_s,l)$ is decided by the above equations 31 to 34, the number $N_{RS}^{PUCCH}$ of RSs for each slot is decided by the above table 13, and the orthogonal sequence $\tilde{w}(n)$ is shown in the following table 15.

TABLE 15

| Normal cyclic prefix | Extended cyclic prefix |
|---|---|
| [1 1] | [1] |

In case of PUCCH format 3, the cyclic shift (CS) $\alpha_{\tilde{p}}(n_s,l)$ is decided by the following equation 41.

$\alpha_{\tilde{p}}(n_s,l) = 2\pi \cdot n_{cs}^{(\tilde{p})}(n_s,l)/N_{sc}^{RB}$ $n_{cs}^{(\tilde{p})}(n_s,l) = (n_{cs}^{cell}(n_s,l) + n'_{\tilde{p}}(n_s)) \bmod N_{sc}^{RB}$ [Equation 41]

In Equation 41, $n'_{\tilde{p}}(n_s)$ is decided by the following table, and $n_{oc,0}^{(\tilde{p})}$ and $n_{oc,1}^{(\tilde{p})}$ are decided by the above equation 37.

TABLE 16

| | $n'_{\tilde{p}}(n_s)$ | |
|---|---|---|
| $n_{oc}^{(\tilde{p})}$ | $N_{SF,1} = 5$ | $N_{SF,1} = 4$ |
| 0 | 0 | 0 |
| 1 | 3 | 3 |
| 2 | 6 | 6 |
| 3 | 8 | 9 |
| 4 | 10 | N/A |

In addition, the number $N_{RS}^{PUCCH}$ of RSs for each slot for DMRS of PUCCH format 3 is decided by the above table 13, and the orthogonal sequence $\bar{w}(n)$ is decided by Table 15.

A scaling factor $\beta_{PUCCH}$ is multiplied by the PUCCH DM RS sequence $r_{PUCCH}^{(\tilde{p})}(\cdot)$, and the resource element (k,l) on the antenna port (p) is mapped to a sequence beginning with $r_{PUCCH}^{(\tilde{p})}(0)$. The resource mapping is performed in ascending numerical order, i.e., the resource mapping is initially performed at the resource element (k) and then performed at the other resource element (l). Finally, the resource mapping is performed on the basis of the slot number.

UL frequency hopping may be applied to PUSCH shown in FIG. 12. If the UL frequency hopping is enabled by the predefined hopping pattern, the set of physical resources to be used for data transmission at the slot $n_s$ is given by the scheduling grant and the predefined pattern shown in the following table 42.

$$\tilde{n}_{PRB}(n_s) = (\tilde{n}_{VRB} + f_{hop}(i) \cdot N_{RB}^{sb} +$$ [Equation 42]
$$((N_{RB}^{sb} - 1) - 2(\tilde{n}_{VRB} \bmod N_{RB}^{sb})) \cdot f_m(i))$$
$$\bmod(N_{RB}^{sb} \cdot N_{sb})$$

$i = \begin{cases} \lfloor n_s/2 \rfloor & \text{inter-subframe hopping} \\ n_s & \text{intra and inter-subframe hopping} \end{cases}$ $n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$ $\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$ In Equation 42, $n_{VRB}$ is obtained from the scheduling grant, and the parameter "pusch-HoppingOffset" ($N_{RB}^{HO}$) is provided through higher layers. Each sub-band size $N_{RB}^{sb}$ can be represented by the following equation 43.

$$N_{RB}^{sb} = \begin{cases} N_{RB}^{UL} & N_{sb} = 1 \\ \lfloor(N_{RB}^{UL} - N_{RB}^{HO} - N_{RB}^{HO} \bmod 2)/N_{sb}\rfloor & N_{sb} > 1 \end{cases}$$ [Equation 43]

In Equation 43, the number $N_{sb}$ of sub-bands is given by higher layers. The above function $f_m(i) \in \{0,1\}$ may decide whether or not mirroring will be used.

The hopping function $f_{hop}(i)$ and the function $f_m(i)$ are represented by the following equations 44 and 45.

$$f_{hop}(i) = \begin{cases} 0 & N_{sb} = 1 \\ \left(f_{hop}(i-1) + \sum_{k=i\cdot 10+1}^{i\cdot 10+9} c(k) \times 2^{k-(i\cdot 10+1)}\right) \bmod N_{sb} & N_{sb} = 2 \\ \left(f_{hop}(i-1) + \left(\sum_{k=i\cdot 10+1}^{i\cdot 10+9} c(k) \times 2^{k-(i\cdot 10+1)}\right) \bmod (N_{sb}-1) + 1\right) \bmod N_{sb} & N_{sb} > 2 \end{cases}$$ [Equation 44]

$$f_m(i) = \begin{cases} i \bmod 2 & N_{sb} = 1 \text{ and intra and inter-subframe hopping} \\ \text{CURRENT\_TX\_NB} \bmod 2 & N_{sb} = 1 \text{ and inter-subframe hopping} \\ c(i \cdot 10) & N_{sb} > 1 \end{cases}$$ [Equation 45]

In this case, $f_{hop}(-1)=0$ is given, the pseudo-random sequence c(i) is denoted by Equation 2, and CURRENT_TX_NB may indicate a transmit (Tx) number of a transmit (Tx) block to be transmitted at the slot $n_s$. The pseudo-random sequence generator may be initialized by the following equations whenever each frame begins.

$c_{init} = N_{ID}^{cell}$, in case of a frame structure type 1 [Equation 46]

$c_{init} = 2^9 \cdot (n_f \bmod 4) + N_{ID}^{cell}$, in case of a frame structure type 2 [Equation 47]

A PUSCH RS of FIG. 12 (hereinafter, PUSCH DM RS) is transmitted per layer. A PUSCH DM RS sequence $r^{(\tilde{p})}_{PUSCH}(\cdot)$ associated with a layer $\lambda \in \{0, 1, \ldots, v-1\}$ is given by $r_{PUSCH}^{(\lambda)}(m \cdot M_{sc}^{RS} + n) = w^{(\lambda)}(m) r_{u,v}^{(\alpha\_\lambda)}(n)$ [Equation 48]

In Equation 48, m=0, 1, n=0, . . . , $M_{sc}^{RS}-1$, $M_{sc}^{RS} = M_{sc}^{PUSCH}$. $M_{sc}^{PUSCH}$ is scheduled bandwidth for UL transmission, expressed as a number of subcarriers. The orthogonal sequence $w^{(\lambda)}(m)$ may be given by Table 17 using the cyclic shift field in most recent UL-related DCI for the transport block associated with the corresponding PUSCH transmission. Table 7 shows an example mapping of cyclic shift field in UL-related DCI format to $n^{(2)}_{DMRS,\lambda}$ and $[w^{(\lambda)}(0) w^{(\lambda)}(1)]$.

The cyclic shift $\alpha\_\lambda$ in slot $n_s$ is given as $2\pi n_{cs,\lambda}/12$, and $n_{cs,\lambda}$ is given by $n_{cs,\lambda} = (n^{(1)}_{DMRS} + n^{(2)}_{DMRS,\lambda} + n_{PN}(n_s)) \bmod 12$. [Equation 49]

$n^{(1)}_{DMRS}$ is given by Table 8 according to cyclicShift provided by higher layers. Table 18 shows a mapping of cyclicShift given by higher layers to $n^{(1)}_{DMRS}$.

TABLE 18

| cyclicShift | $n^{(1)}_{DMRS}$ |
|---|---|
| 0 | 0 |
| 1 | 2 |

TABLE 18-continued

| cyclicShift | $n^{(1)}_{DMRS}$ |
|---|---|
| 2 | 3 |
| 3 | 4 |
| 4 | 6 |
| 5 | 8 |
| 6 | 9 |
| 7 | 10 |

$n_{PN}(n_s)$ is given by the following equation using the cell-specific pseudo-random sequence c(i).

$n_{PN}(n_s) = \sum_{i=0}^{7} c(8 N_{symb}^{UL} \cdot n_s + i) \cdot 2^i$ [Equation 50]

In Equation 50, the pseudo-random sequence c(i) is defined by Equation 2. The pseudo-random sequence generator is initialized with $c_{init}$ according to the following equation at the beginning of each radio frame.

$$c_{init} = \left\lfloor \frac{N_{ID}^{cell}}{30} \right\rfloor \cdot 2^5 + f_{ss}^{PUSCH}$$ [Equation 51]

In association with each antenna port used for PUSCH transmission, the PUSCH DM RS sequence $\tilde{r}_{PUSCH}^{(\tilde{p})}(\cdot)$ is

TABLE 17

| Cyclic Shift Field in uplink-related DCI format | $n^{(2)}_{DMRS,\lambda}$ | | | | $[w^{(\lambda)}(0) \; w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 1] | [1 1] | multiplied by an amplitude scaling factor $\beta_{PUSCH}$, and is mapped to resource blocks with the sequence beginning with $\tilde{r}_{PUSCH}^{(\tilde{p})}(0)$. The mapping operation for the resource elements (k,l) may correspond to l=3 in case of the normal CP, and may correspond to l=2 in case of the extended CP. This mapping operation is initially performed at the index (k) within one subframe and then performed in ascending numerical order of slot numbers within one subframe.

Referring to Equations 1 to 4, in case of downlink, when the eNB generates a UE-specific RS to be transferred to a specific cell, the eNB may use the same physical layer cell ID $N_{ID}^{cell}$ for all UEs. In accordance with the current 3GPP LTE(-A) system, one UE receives a downlink signal within one cell, so that the UE must recognize one $N_{ID}^{cell}$ and one $n_{SCID}$ so as to detect its own UE-specific RS. Referring to Equations 12, 16, and the like, UEs located in one cell may initialize the pseudo-random sequence generator configured to generate the RS sequence using the same $N_{ID}^{cell}$. From the viewpoint of one UE, the UE needs to transmit the UL signal to only one cell, such that the UE may use only one $N_{ID}^{cell}$ so as to generate PUSCH DM RS, PUCCH DM RS, and SRS. That is, according to the legacy system in which a UE may receive a downlink signal within only one cell and may transmit an uplink signal to only one cell, cell (DL) and UE (UL)-based DM RS sequences have been used. In other words, a downlink cell and an uplink cell for use in the legacy communication system are identical to each other and the legacy communication system is designed to perform UL/DL transmission within only one cell, so that a UE may obtain $N_{ID}^{celll}$ on the basis of downlink synchronization signals (i.e., Primary Synchronization Signal (PSS) and Secondary Synchronization Signal (SSS)) having been received from a serving cell, and the obtained $N_{ID}^{cell}$ needs to be used for creation of UL/DL RS sequences.

However, under the downlink CoMP situation, a plurality of cells or a plurality of Tx points (TPs) may simultaneously participate in transmission of downlink signals, or the cells or TPs may selectively transmit such downlink signals to the UE. For example, one of two points may perform DL transmission (i.e., PDSCH transmission) or the other one point may not perform any transmission (in case of CB/CS and DPS). In another example, DL transmission may also be performed at both of two points (in case of JT). In addition, under the uplink CoMP situation, one UE may perform UL transmission to a plurality of cells or a plurality of reception points (RPs), or may also perform UL transmission for some of the cells or RPs as necessary. In this case, if a transmitter transmits the RS sequence generated on the basis of $N_{ID}^{cell}$ of the legacy serving cell based on the conventional art, a receiver may not unexpectedly detect the corresponding RS sequence.

In addition, as can be seen from Equations 40 and 42, in case of a sequence for an uplink RS, UEs located in one cell may generate RS sequences using the same slot number, i.e., a slot number (or index) of a downlink radio frame of the one cell. From the viewpoint of one UE, since the UE transmits an uplink signal only to one cell, the UE may use only one $n_s$ to generate PUSCH DM RS, PUCCH DM RS, and SRS. In this case, if a transmitter transmits the generated RS sequence according to the legacy scheme, a receiver may not detect the corresponding RS sequence.

Figure 13:
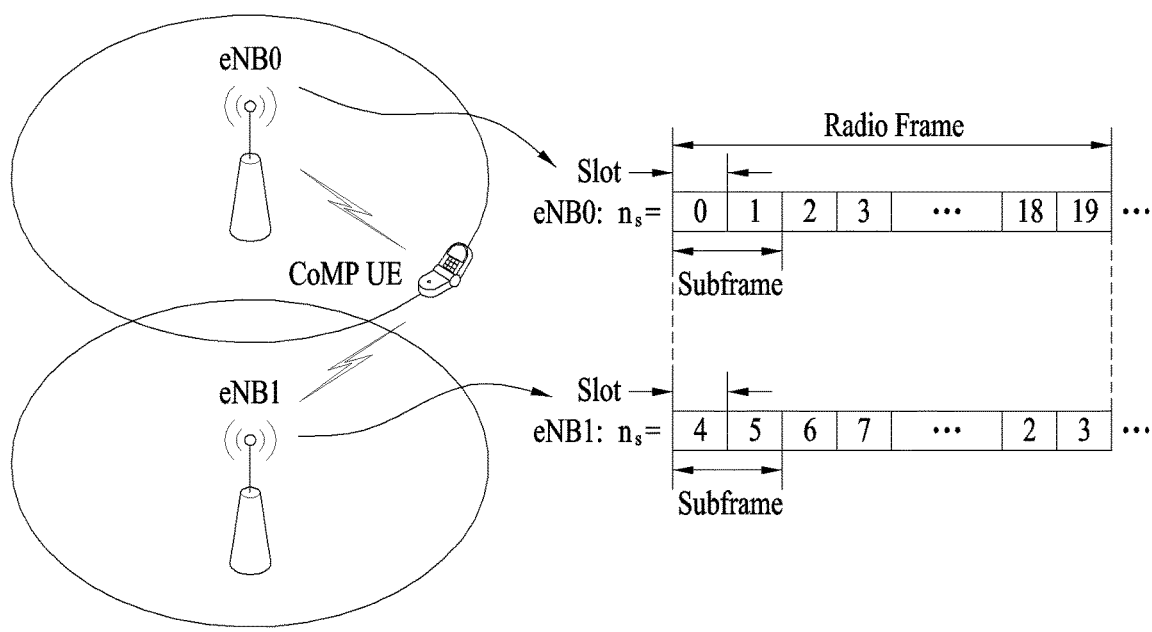
FIG. 13 illustrates problem occurring in the coordinated multi-point transmission/reception (CoMP) scheme.

FIG. 13 shows the problem encountered when the RS sequence generated in DL CoMP or UL CoMP is detected. In the meantime, the problem does not occur only when the receiver detects the RS sequence, and can also occur even when UL data or a sequence for a control signal is generated. In more detail, the embodiments of the present invention are associated with DL DMRS, UL DMRS, SRS, PUSCH, and PUCCH related to the CoMP operation, and many more signals or many more channels may be associated with the embodiments of the present invention.

As can be seen from FIG. 13, eNB0, eNB1, and CoMP UE may perform the CoMP Tx/Rx operations. For convenience of description and better understanding of the present invention, although only two eNBs are shown in FIG. 13, it should be noted that many more eNBs can also be included in FIG. 13 without departing from the scope or spirit of the present invention. It is assumed that eNB may be referred to as a first TP, eNB1 may be referred to as a second TP, and a serving cell of the CoMP UE may be referred to as a first TP. In addition, it is assumed that the slot number ($n_{s1}$) of a radio frame of the first TP is different from the slot number ($n_{s2}$) of a radio frame of the second TP at the same time point irrespective of any reason.

For example, the slot number ($n_{s1}$) may be different from the slot number ($n_{s2}$) at a specific time point due to the reason of a communication network configuration. That is, due to a specific reason, the slot number ($n_{s1}$) may deviate from the slot number ($n_{s2}$) by a predetermined offset. In another example, according to the enhanced inter-cell interference coordination (eICIC) scheme, in order to intentionally assign different slot numbers to at least two cells in such a manner that a special signal or channel to be transmitted only at a specific slot number (or index) such as PSS/SSS and PBCH is not transmitted at the same slot number by the at least two cells, an offset may be given as necessary. That is, according to the eICIC scheme, in order to perform interference coordination on a time domain, specific subframes are configured to have Almost Blank Subframe (ABS) or reduced-power ABS, etc. according to the predefined subframe bitmap pattern, and the offset may be established in such a manner that minimum interference is applied to PSS/SSS, PBSCH, etc. The reason of causing a difference in slot numbers is only exemplary. For another reason, slot numbers of the radio frame may be different from each other at a specific time point between at least two TPs.

Due to the above CoMP characteristics, different $N_{ID}^{cell}$ values according to multiple TP/RP parts may be present, and a different in slot number between the TP/RP parts may cause errors when the RS sequence is generated or detected in the CoMP operation, when sequences for a UL data signal or UL control signal are generated or detected, or when frequency hopping is performed.

Therefore, for the CoMP situation in which several cells or several TP/RP parts participate in UE communication, although different points simultaneously transmit or receive data, methods for generating/transmitting DM RS for data received from the different points need to be defined. One TP may transmit a DL signal to the UE through one or more cells, and one RP may receive an UL signal from the UE through one or more cells. For convenience of description and better understanding of the present invention, a cell for transmitting a DL signal will hereinafter be referred to as a TP, and a cell for receiving a UL signal will hereinafter be referred to as an RP, and the embodiments of the present invention will hereinafter be described in detail. In the present invention, a difference in slot number between eNBs may be a difference in slot number between at least two eNBs, a difference in slot number between TP/RP parts may be a difference in slot number between at least two TP/RP parts, and/or a difference in slot number between cells may be a difference in radio-frame slot number between at least two cells, at the same time point or a specific time. For convenience of description, the term "the same time" or "the specific time" will herein be omitted, and the term "the same time" or "the specific time" will hereinafter be referred to as a difference (value) in slot number or a slot number offset.

If one TP from among two TPs having different cell IDs selectively transmits data to the UE or if the UE selectively transmits data to one RP from among two RPs having different cell IDs, the present invention generates and transmits a UE-specific (uplink or downlink) DM RS sequence on the basis of a cell ID ($N_{ID}^{cell}$) designated in each TP/RP. In addition, the present invention generates and transmits a UE-specific (uplink or downlink) DM RS sequence on the basis of a difference in slot number at the same time point or at a specific time between TP/RS parts. The UE may demodulate PDSCH data received from each point using downlink DM RS sequences received from different TPs. The UE generates UL RS sequences (e.g., PUCCH DM RS sequence, PUSCH DM RS sequence, SRS, etc.) to be transmitted to different TPs, UL data, or a control signal on the basis of a cell ID designated in each TP/RP and/or a slot number of a radio frame, so that the UE transmits the generated sequences, data, or signal to the corresponding TPs.

Although the UE can obtain $N_{ID}^{cell}$ of the specific cell using a DL synchronization signal of a specific cell, the UE is unable to recognize $N_{ID}^{cell}$ of another cell instead of the specific cell. In addition, although the UE obtains a cell ID of a downlink cell using the downlink synchronization signal, the UE is unable to recognize a cell ID of the UL cell when a DL cell and an UL cell are different from each other. Therefore, according to the embodiment, the eNB may indicate a cell ID through higher layer signaling. Here, the cell ID will be used by the UE in case of UL/DL RS sequence generation, in case of sequence generation for an UL signal, or in case of resource mapping. The cell ID may be an ID of a cell related to the UL/DL RS or UL/DL signals, or may be a virtual ID.

In addition, although the UE can obtain a radio frame slot number $n_s$ of the specific cell using a DL synchronization signal of a specific cell, the UE is unable to recognize $n_s$ of another cell instead of the specific cell. In addition, although the UE obtains $n_s$ of a downlink cell using the DL synchronization signal, the UE is unable to recognize $n_s$ of the downlink cell when the DL cell is different from the UL cell. Therefore, according to the embodiments, the eNB may inform the UE of several $n_s$ values or information regarding the several $n_s$ values through the higher layer signaling, wherein the $n_s$ values or information regarding the $n_s$ values may be used in UL/DL RS sequence generation, in sequence generation for UL signals, or in resource mapping. In this case, although the eNB may be a serving cell of the UE, the scope or spirit of the present invention is not limited thereto. For example, the eNB may semi-statically inform the UE of a cell ID and/or a scrambling ID, or may also semi-statically inform the UE of $n_s$ and/or $\Delta n_s$ (hereinafter referred to as "$n_s$ information") corresponding to a difference of $n_s$ values between the eNBs. In more detail, the eNB may semi-statically inform the UE of {cell ID/scrambling ID, $n_s/\Delta n_s$} in pairs. Alternatively, the eNB may semi-statically inform the UE of a plurality of pairs, each of which includes a plurality of cell IDs, and/or a scrambling ID, and a plurality of $n_s$ values, through RRC. An ID to be used at the corresponding Tx/Rx time point from among the above-mentioned elements may be dynamically signaled to the UE using DCI transmitted through PDCCH. In case of downlink, the eNB may dynamically indicate the cell ID associated with PDSCH and/or the $n_s$ information through DCI, and may transmit not only data but also a downlink DM RS sequence generated by the cell ID and/or $n_s$ information to the UE through the corresponding point. The UE may recognize which downlink DM RS sequence will be received on the basis of the indicated ID and/or $n_s$ information. Accordingly, the UE may detect the downlink DM RS sequence related to DL data, and may demodulate the DL data using the downlink DM RS. In case of uplink, the UE may receive the ID and/or $n_s$ information to be used for generation of the UL RS sequence through the DCI, and may generate the UL RS sequence using the received ID and/or $n_s$ information and transmit the UL RS sequence to the eNB. The eNB has already recognized which ID will be used by the UE configured to generate the UL RS sequence, the UL RS sequence can be effectively detected. The eNB may demodulate UCI and/or PDSCH data received from the UE through the corresponding point, using the UL RS sequence.

In this case, the $n_s$ information may indicate $n_s$ of a specific cell and/or $\Delta n_s$ corresponding to a difference in $n_s$ values between the eNBs. That is, the $n_s$ information may include a slot number $n'_s$ of a cell instead of a serving cell for legacy communication from among TP/RP parts participating in CoMP. Alternatively, the $n_s$ information may include a difference between the $n_s$ value of the serving cell and the $n'_s$ value of the cell not used as the serving cell, or may also include an offset. In LTE(-A), the slot number ($n_s$) of the radio frame may correspond to any one of 0 to 19 (See FIG. 1) because a total of 20 slots are contained in a single radio frame. Therefore, assuming that a difference between $n_s$ of the serving cell and $n'_s$ of the cell not used as the serving cell is denoted by an integer '4', this means that $\Delta n_s=4$ is achieved, and the $n'_s$ value of the cell not used as the serving cell may be denoted by the following equation 52.

$$n'_s = \mod(n_s + \Delta n_s, 20) \quad \text{[Equation 52]}$$

That is, as can be seen from the above equations, the cell ID/scrambling ID related to a channel or signal to be used for CoMP communication may be replaced with a variety of RS sequences, a sequence for PUSCH or PUCCH, or $N_{ID}^{cell}$ applied to resource mapping, and $\mod(n_s + \Delta n_s, 20)$ may also be replaced with $n_s$ as necessary.

Meanwhile, in case of CoMP JT or CoMP JR, a point (hereinafter referred to as a downlink serving point) for transmitting a downlink signal may be different from a point (hereinafter referred to as an uplink serving point) for receiving an uplink signal. IN addition, a plurality of points may participate in DL transistor, and a plurality of points may participate in UL reception. Therefore, it is necessary for the system to be designed in consideration of the above-mentioned situation. Detailed embodiments of the present invention will hereinafter be described in detail.

<PDSCH Transmission and PUCCH Transmission>

FIGS. 14 to 17 are conceptual diagrams illustrating PDSCH transmission and PUCCH transmission corresponding to PDSCH according to the embodiments of the present invention.

Figure 14:
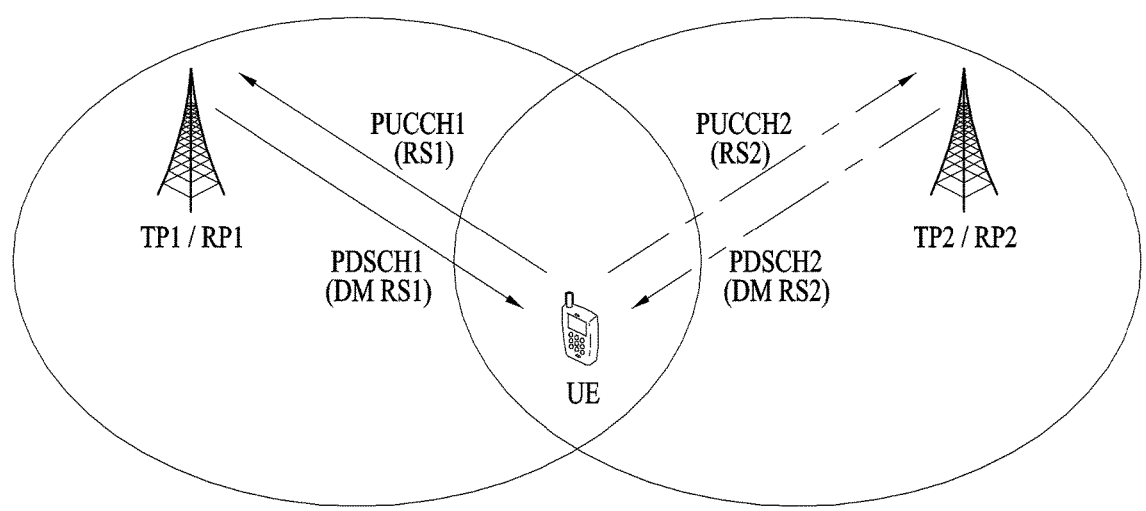
FIG. 14 illustrates PDSCH (physical downlink shared channel) CoMP and PUCCH transmission.

FIG. 14 exemplarily shows PDSCH CoMP and the corresponding PUCCH transmission. In particular, FIG. 14 shows the CoMP operation based on two TPs (TP1, TP2) and two RPs (RP1, RP2). In FIG. 14, TP1 may correspond to RP1, and TP2 may correspond to RP2.

Referring to FIG. 14, PDSCH1 transmission from TP1 to UE may be carried out using DM RS1, and PDSCH2 transmission from TP2 to UE may be carried out using DM RS2. Similarly, PUCCH1 transmission in the UE-to-RP1 link may use PUCCH RS1, and PUCCH2 transmission in the UE-to-RP2 link may use PUCCH RS2. In FIG. 14, in case of using two downlinks and two uplinks, only some downlinks may be used at a specific time according to the CoMP operation (CS/CB, JT/JR), and associated UL transmission may also be carried out only in some uplinks. The activated UL-DL combination may be achieved in various ways according to the CoMP scheme.

Figure 15:
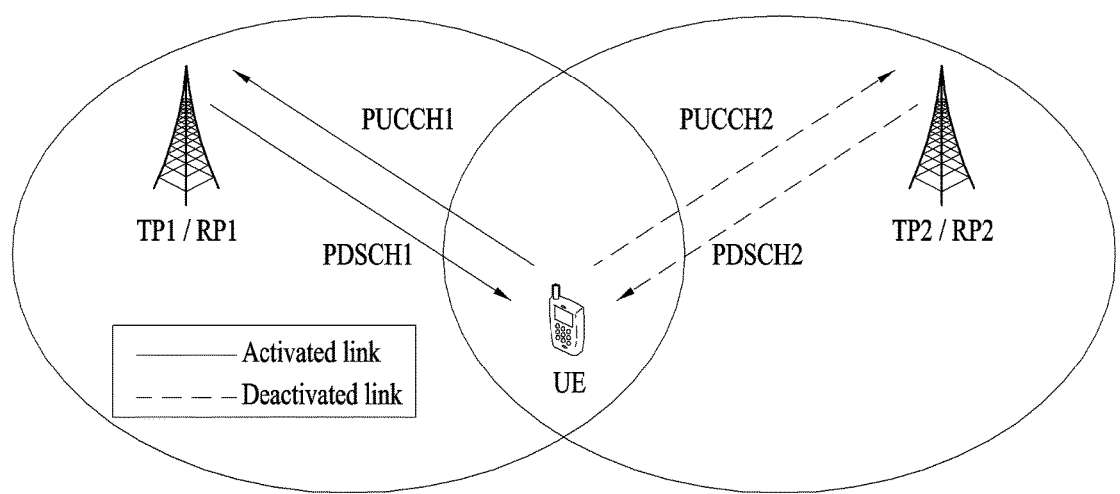
FIG. 15 illustrates DL transmission and UL transmission when DL and UL are associated with the same cell identity (ID).

The CoMP operation may be performed where the DL serving cell and the UL serving cell are the same one. FIG. 15 exemplarily shows DL transmission and UL transmission for use in the case in which DL and UL are associated with the same cell ID.

Referring to FIG. 15, from among a plurality of points capable of participating in UE communication, only TP1 may be selected as downlink, only PDSCH1 is transmitted to the UE through TP1, and RP1 may be selected as an uplink in response to PDSCH1, so that only PUCCH1 may be transmitted by UE. That is, from among communication links participating in CoMP, the TP1-to-UE link and the UE-to-RP1 link may be activated, and the TP2-to-UE link and the UE-to-RP2 link may be deactivated.

Figure 16:
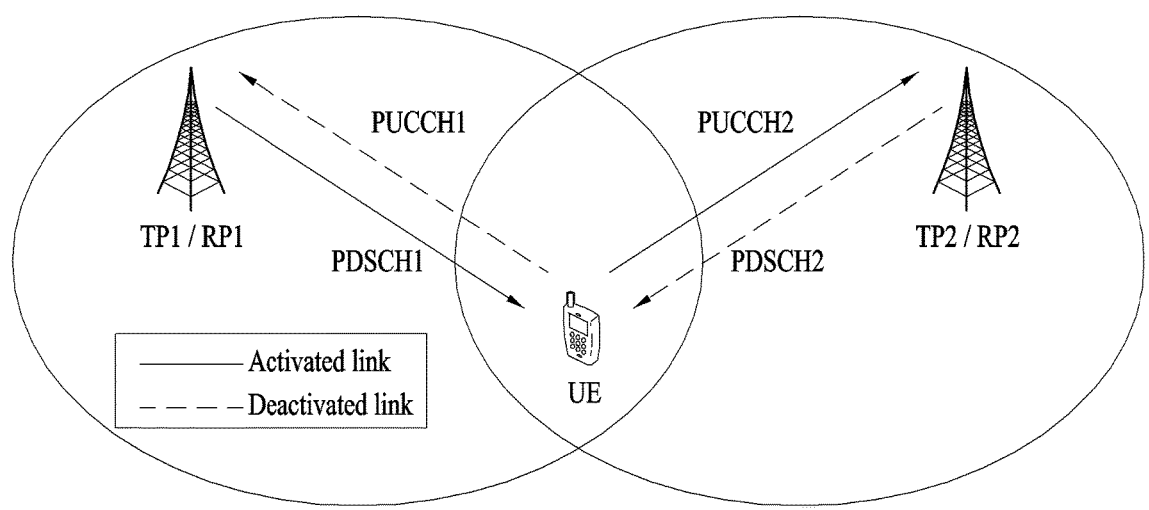
FIG. 16 illustrates DL transmission and UL transmission when DL and UL are associated with different cell IDs.

The CoMP operation may be performed where the DL serving cell and the UL serving cell are different. FIG. 16 exemplarily shows DL transmission and UL transmission when DL and UL are associated with different cell IDs.

Referring to FIG. 16, from among points participating in UE communication, UL ACK/NACK for PDSCH1 transmission may be transferred to PUCCH2 instead of PUCCH1.

Referring to FIG. 15, assuming that the DL serving cell and the UL serving cell are identical to each other, UL transmission and DL transmission can be performed using only one cell ID. Since only one cell participates in communication, the slot number ($n_s$) of the radio frame requires only the slot number of the one cell. As shown in FIG. 16, assuming that a DL serving cell and an UL serving cell are different from each other, different cell IDs and/or $n_s$ pieces are needed for the DL and UL serving cells. The higher the number of cells participating in CoMP, the higher the number of combinations. From the viewpoint of the UE, the UE correctly performs DL demodulation, and the UE must recognize cell IDs and/or $n_s$ pieces based on various combinations so as to perform appropriate UL transmission (e.g., ACK/NACK PUCCH transmission). That is, the UE supporting the CoMP must recognize the cell ID and/or the scrambling ID, and $n_s$ information, that are needed for generating the downlink DM RS at each CoMP combination, and must also recognize the cell ID and/or the scrambling ID, and $n_s$ information, that are needed for RS generation on uplink at each CoMP operation. Therefore, the eNB according to the embodiment may inform the UE of different Tx parameters (e.g., cell ID, scrambling ID, $n_s$ information, etc.) according to the UL and DL combination through higher layer signaling and/or physical layer signaling. For example, the eNB may transmit not only a plurality of cell ID combinations based on available combinations of the DL serving cell and the UL serving cell, but also $n_s$ information associated with the cell ID combinations to the UE. The eNB may transmit specific information indicating one combination from among the plurality of cell ID combinations to the UE over a PDCCH or the like at every subframe. In other words, the eNB may construct a plurality of TP-specific Tx parameters and a plurality of RP-specific Tx parameters, and may transmit the constructed parameters to the UE in advance. From among the plurality of combinations, a specific combination to be used at one Tx/Rx time point (e.g., subframe) may be dynamically signaled to the UE.

For example, if two TPs and two RPs participate in CoMP as shown in FIGS. 14, 15, and 16, the following combinations may be made available.

TABLE 19

| Set indication | Downlink cell/point | Uplink cell/point |
| --- | --- | --- |
| 0 | TP1 (DL cell ID #1) | RP1 (UL cell ID #1) |
| 1 | TP1 (DL cell ID #1) | RP2 (UL cell ID #2) |
| 2 | TP2 (DL cell ID #2) | RP2 (UL cell ID #2) |
| 3 | TP2 (DL cell ID #2) | RP1 (UL cell ID #1) |

In addition, for example, assuming that TP1/RP1 provides the cell ID information/$n_s$ information for CoMP to the UE, the cell ID information and the $n_s$ information may make a pair as shown in the following table 20. In addition, if many more TP/RP parts are present in the CoMP, one pair of information may be provided several times, and the corresponding information may be indicated through the UL- or DL-related DCI.

TABLE 20

| Set indication | Cell ID | $n_s$ information |
| --- | --- | --- |
| 0 | TP2 (UL/DL cell ID #2) | $n'_s$ = mod($n_s$ + $n_s$, 20) OR $n_s$ |

Figure 17:
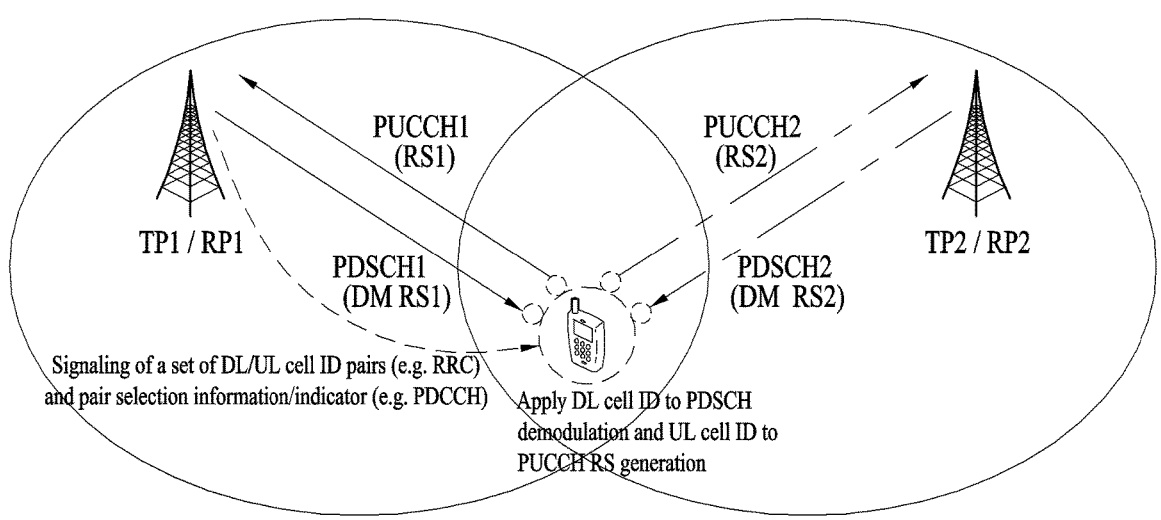
FIG. 17 illustrates a signal transmission method for DL CoMP according to an embodiment of the present invention.

FIG. 17 is a conceptual diagram illustrating a method for transmitting signals for downlink CoMP according to the embodiment of the present invention.

Referring to FIG. 17, the eNB may share the set information of the cell ID combination of TP/RP and the slot number offset information with the UE, and may inform the UE of one combination from among a plurality of sets configured through additional signaling. Alternatively, the eNB may indicate the cell ID of TP or RP needed for the UE, may also indicate information regarding a slot number of a radio frame of the TP or RP. For example, a difference between a slot number of the radio frame of a reference cell (i.e., a serving cell of the UE) and a slot number of the TP or RP radio frame may be signaled to the UE. Meanwhile, if the set is rarely changed or if there is a need to change the set, the eNB may decide which set will be used through RRC signaling as necessary. In case of CoMP configured in a manner that the set change is cyclically generated, the eNB and the UE may be constructed in such a manner that a given set may be changed without additional signaling every unit time. In this case, although the eNB may provide the UE with specific information indicating that slot number information of the radio frame of the cell ID, and TP or RP is provided as DL or UL transmission for CoMP, not only other parameters (e.g., scrambling ID), that is capable of achieving the present invention or capable of identifying each cell, but also radio frame slot number information between different TP/RP parts may be provided as DL/UL RS sequence generation information to the UE.

According to the embodiment of the present invention, the UE may obtain the DL cell ID or the scrambling ID, and the slot number information ($n_s$ information) from the eNB, the DL cell ID or scrambling ID, and the slot number information may be used as parameters for generating a downlink DM RS. Likewise, according to the above-mentioned embodiment, the UE may obtain a UL cell ID or a scrambling ID, and slot number information from the eNB, and may use the UL cell ID or scrambling ID, and the slot number information as an initial value of a sequence generator configured to generate the RS sequence used in PUCCH transmission.

<PUCCH Transmission and PUSCH Transmission>

If the UE receives a DL grant through a PDCCH, the UE may receive DL data through a PDSCH according to the DL grant, and may transmit ACK/NACK regarding the DL data over a PUCCH at an uplink subframe located after lapse of a predetermined number of subframes starting from the subframe at which the DL data is received. For example, the UE may receive the DL data over a PDSCH at the subframe (n) according to the DL grant that is received over a PDCCH at the subframe (n). The UE may transmit the ACK/NACK related to the success or failure of decoding of the DL data over a PUCCH at the subframe (n+k) in so far as a PUSCH allocated to the subframe (n+k) (e.g., in case of FDD, k=4) is not present under the condition that simultaneous transmission of PUSCH and PUSCH is not allowed. In other words, even in the above-mentioned example, a cell for transmitting a PDCCH to the UE may be different from a cell to be used for PUCCH transmission by the UE because of the CoMP operation, instead of $N_{ID}^{cell}$ and $n_s$ of the legacy serving cell, not only an ID of a cell to be used for PUCCH reception, but also the slot number information may be used not only for sequence generation related to the above-mentioned PUCCH format, but also for initialization of the sequence generator configured to generate the sequence.

Meanwhile, if the UE receives the UL grant over a PDCCH, the UE transmits UL data over a PUSCH according to the UL grant. For example, the UE may transmit the UL data over a PUSCH at the subframe n'+k (e.g., in case of FDD, k=4) according to the UL grant that is received over a PDCCH at the subframe (n'). In this case, since a cell for transmitting the PDCCH to the UE may be different from a cell to be used for PUSCH transmission by the UE because of the CoMP operation, instead of $N_{ID}^{cell}$ and $n_s$ of the legacy serving cell, not only an ID of a cell to be used for PUSCH reception, but also the slot number information may be used for sequence generation related to PUSCH, for initialization of the sequence generator configured to generate the sequence, for resource mapping, etc.

Figure 18:
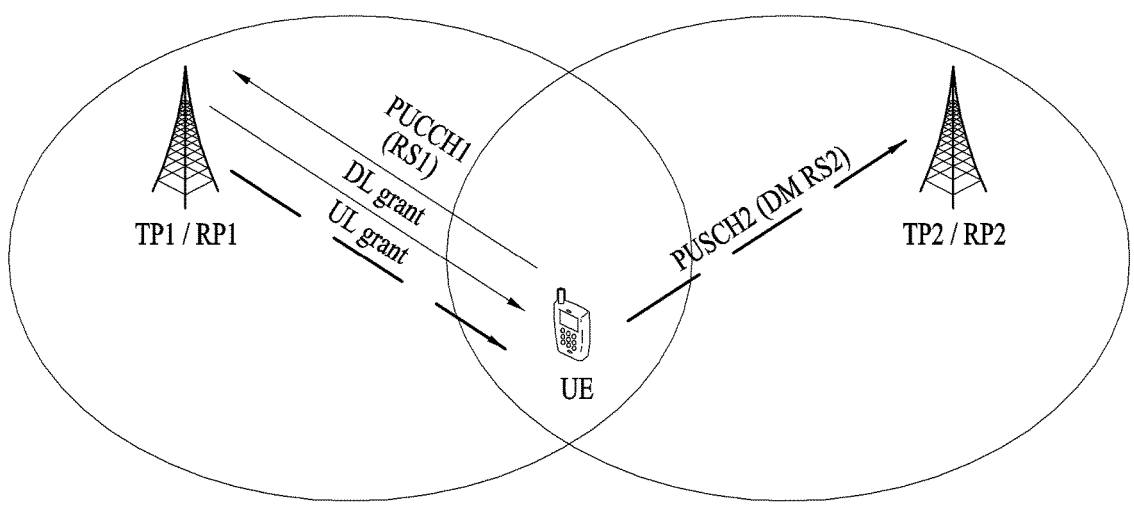
FIG. 18 illustrates a signal transmission method for DL CoMP and UL CoMP according to an embodiment of the present invention.

FIG. 18 is a conceptual diagram illustrating a conceptual diagram illustrating a method for transmitting signals for downlink CoMP and uplink CoMP according to the embodiment of the present invention.

If each of the DL CoMP operation and the UL CoMP operation is independently performed, assuming that signaling information regarding the cell ID and $n_s$ information for RS sequence generation is independently performed for each of the DL CoMP and the UL CoMP, PUCCH transmission based on the DL grant and PUSCH transmission based on the UL grant may be carried out for different RPs. For example, the UE may perform scheduling/indication in such a manner that PUCCH (hereinafter referred to as PUCCH1) corresponding to PDSCH transmission (hereinafter referred to as PDSCH1 transmission) based on the DL grant can be transferred from TP1 to RP1. PUSCH transmission (hereinafter referred to as PUSCH2 transmission) based on the UL grant may be scheduled or indicated in such a manner that the PUSCH transmission information may be transmitted from TP1 to RP2. In this case, so long as the PUCCH1 transmission time and the PUSCH2 transmission time do not correspond to the same subframe, the UE may transmit PUCCH1 using the cell ID of RP1, and may transmit PUSCH2 using the cell ID and $n_s$ information of RP2 (i.e., since the DL is associated with TP1 and the UL is associated with RP2, it is necessary to change the slot number to another slot number.) as shown in the above-mentioned embodiments. In other words, the UE may generate the DM RS sequence (RS1) for PUCCH1 on the basis of the cell ID of RP1, may transmit the generated DM RS sequence (RS1) along with PUCCH1. In addition, the UE may generate the DM RS sequence (DM RS2) for PUSCH2 on the basis of the cell ID and $n_s$ information of RP2, and transmit the DM RS sequence (DM RS2) along with PUSCH2. According to the legacy method for obtaining the cell ID through a DL synchronization signal, the UE is unable to simultaneously recognize the cell ID of RP1 and the cell ID of RP2, and the eNB of the present invention may separately provide the UE with the cell ID of RP1 and/or the cell ID of RP2, and $n_s$ information related to RPs through RRC signaling or PDSCH, such that the eNB can also provide the UE with the above information even when PUSCH RP is different from PUCCH RP.

In the meantime, the UE receives the DL grant and the UL grant from TP 1 at the subframe (n), so that the PUCCH1 transmission time and the PUSCH2 transmission time may correspond to the same subframe. In this case, the UE configured not to simultaneously transmit PUCCH and PUSCH is regarded as the presence of misconfiguration, and the UE may also be configured to drop PUCCH1 transmission and PUSCH2 transmission. Alternatively, PUCCH2 is piggybacked to PUSCH2 so that the piggyback result may be transferred to RP2. If the UE is configured to simultaneously transmit PUCCH and PUSCH, the UE may independently transmit PUCCH and PUSCH to different RPs, and may generate and transmit PUCCH DM RS and PUSCH DM RS using different cell IDs (if necessary, along with $n_s$ information). Although simultaneous transmission of PUCCH and PUSCH is configured, PUCCH transmission and PUSCH transmission may drop in consideration of implementation difficulty, one of PUCCH transmission and PUSCH transmission may drop according to priority and the other one may be transmitted, so that PUCCH may be piggybacked to PUSCH and the PUCCH can be transmitted within the PUSCH region.

In contrast, SRS is generated using the RS sequence as shown in Equation 5, and the group hopping pattern $f_{gh}(n_s)$ regarding the RS sequence shown in Equation 5 may be initialized on the basis of $N_{ID}^{cell}$. Therefore, although not shown in detail, the UL DM RS generation method using the cell ID and $n_s$ information separately signaled by eNB can also be applied not only to PUCCH DM RS generation and PUSCH DM RS transmission, but also to CoMP SRS generation for a plurality of RPs.

The above-mentioned PUCCH DM RS generation method can be commonly applied to all PUCCH channels (e.g., 1/1a/1b/, 2/2a/2b, 3).

Figure 19:
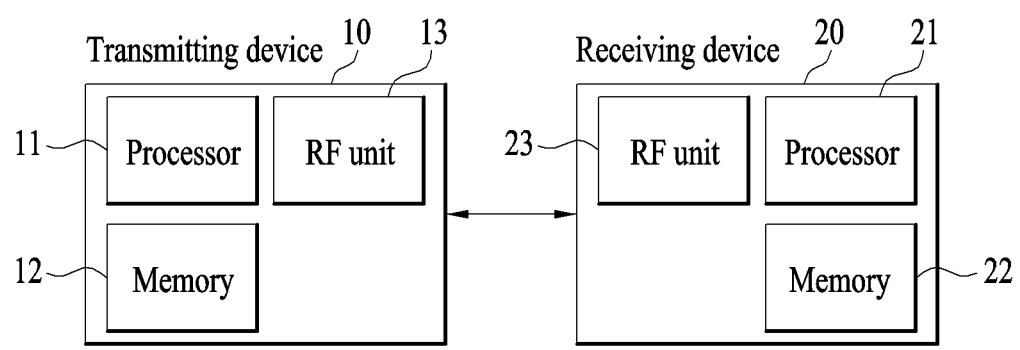
FIG. 19 is a block diagram illustrating elements of a transmitting device 10 and a receiving device 20 for implementing the present invention.

FIG. 19 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of it represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL.

The transmitting device and/or the receiving device may operate a combination of one or more embodiments described above with respect to FIGS. 1 to 18.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for transmitting an uplink signal in a wireless communication system comprising:
   receiving information on a slot number of a radio frame of a second cell and identifier (ID) information including an ID or virtual ID of the second cell from a first cell;
   generating a sequence for an uplink signal based on the information on the slot number and the ID information; and
   transmitting the generated sequence to the second cell,
   wherein the generating the sequence includes:
   generating the sequence using an equation mod ($n_s+\Delta n_s$, 20),
   wherein $n_s$ is a slot number of a radio frame of the first cell, and $\Delta n_s$ is a difference between the slot number of the radio frame of the first cell and the slot number of the radio frame of the second cell.

2. The method according to claim 1, wherein the information on the slot number includes a slot number of a radio frame of the second cell at a specific time.

3. The method according to claim 1, wherein the information on the slot number includes $\Delta n_s$.

4. The method according to claim 1, wherein the generating the sequence includes:
   obtaining a cyclic shift (CS) value based on the information on the slot number; and
   cyclically shifting a given base sequence using the cyclic shift (CS) value.

5. The method according to claim 1, wherein the generating the sequence includes:
   performing group hopping of the sequence using a sequence group number determined according to a group hopping pattern, the group hopping pattern being based on the information on the slot number, wherein the group hopping pattern is determined by a pseudo random sequence.

6. The method according to claim 1, wherein the generating the sequence includes:
performing sequence hopping of the sequence using a base sequence number determined by a pseudo random sequence based on the information on the slot number.

7. The method according to claim 5 or 6, wherein a generator of the pseudo random sequence is initialized using the ID information when each radio frame begins.

8. A user equipment (UE) configured to transmit an uplink signal in a wireless communication system, comprising:
a radio frequency (RF) unit; and
a processor configured to control the RF unit,
wherein the processor is configured to: control the RF unit to receive information on a slot number of a radio frame of a second cell and identifier (ID) information including an ID or virtual ID of the second cell from a first cell, and generate a sequence for an uplink signal based on the information on the slot number and the ID information and transmit the generated sequence to the second cell,
wherein the processor is further configured to, when the generating the sequence:
generate the sequence using an equation mod ($n_s + \Delta n_s$, 20),
wherein $n_s$ is a slot number of a radio frame of the first cell, and $\Delta n_s$ is a difference between the slot number of the radio frame of the first cell and the slot number of the radio frame of the second cell.

* * * * *